(12) United States Patent
Leigh et al.

(10) Patent No.: US 10,795,096 B1
(45) Date of Patent: Oct. 6, 2020

(54) LINE-CARD

(71) Applicant: HEWLETT PACKARD ENTERPRISE DEVELOPMENT LP, Houston, TX (US)

(72) Inventors: Kevin B. Leigh, Houston, TX (US); Everett Salinas, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/398,747

(22) Filed: Apr. 30, 2019

(51) Int. Cl.
*G02B 6/38* (2006.01)
*H01R 12/71* (2011.01)

(52) U.S. Cl.
CPC ......... *G02B 6/3897* (2013.01); *G02B 6/3883* (2013.01); *H01R 12/71* (2013.01)

(58) Field of Classification Search
CPC ..... G02B 6/3897; G02B 6/3883; H01R 12/71
See application file for complete search history.

(56) References Cited

U.S. PATENT DOCUMENTS

| | | | |
|---|---|---|---|
| 6,025,989 A | 2/2000 | Avd | |
| 6,567,274 B1* | 5/2003 | Tusan | H05K 7/1461 361/740 |
| 7,331,717 B2 | 2/2008 | Kiani et al. | |
| 7,355,852 B2 | 4/2008 | Pfahnl | |
| 7,873,056 B2 | 1/2011 | Higuchi | |
| 8,416,570 B2 | 4/2013 | Zeng | |
| 8,798,431 B2 | 8/2014 | Julien | |
| 10,571,635 B1* | 2/2020 | Leigh | G02B 6/35 |
| 2015/0098173 A1* | 4/2015 | Leigh | G06F 1/183 361/679.5 |
| 2015/0323754 A1 | 11/2015 | Leigh et al. | |
| 2017/0257970 A1* | 9/2017 | Alleman | G06F 1/184 |
| 2017/0303439 A1* | 10/2017 | Cader | H05K 7/20836 |
| 2017/0325358 A1* | 11/2017 | Franz | H05K 7/20236 |
| 2018/0120525 A1* | 5/2018 | Leigh | G02B 6/4274 |

OTHER PUBLICATIONS

"ViaLiteHD Fibre Optic Link System 3U chassis," Pulse Power & Measurement Ltd., May 17, 2016, <https://www.vialite.com/wp-content/uploads/2016/05/ViaLiteHD-3U-Chassis-Handbook-HRK3-HB-6.pdf>.

* cited by examiner

*Primary Examiner* — Ellen E Kim
(74) *Attorney, Agent, or Firm* — Hewlett Packard Enterprise Patent Department

(57) ABSTRACT

A line-card comprising: an optical blindmate connector to connect to the midplane of the switch sub-chassis; and a printed circuit board (PCB) including: an application specific integrated circuit (ASIC); an electrical blindmate connector to connect to a midplane of a switch sub-chassis; and a liquid blindmate connector to connect to the switch sub-chassis.

16 Claims, 24 Drawing Sheets

LINE-CARD

BACKGROUND

Large-scale computing systems typically use thousands of interconnected nodes that collaborate to process tasks on multiple levels. The interconnected nodes can be configured to collaborate at the operating system level or to run as a cluster, for example, to allow multiple nodes to share the workload associated with processing incoming requests. The nodes in the computing system are connected together by network cables plugged into multiport switches at the node level that collectively establish the network topology of the computing system. The network cables are typically connected between ports of switches in specific configurations that allow for data transfer through the network topology.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

Figure 1:
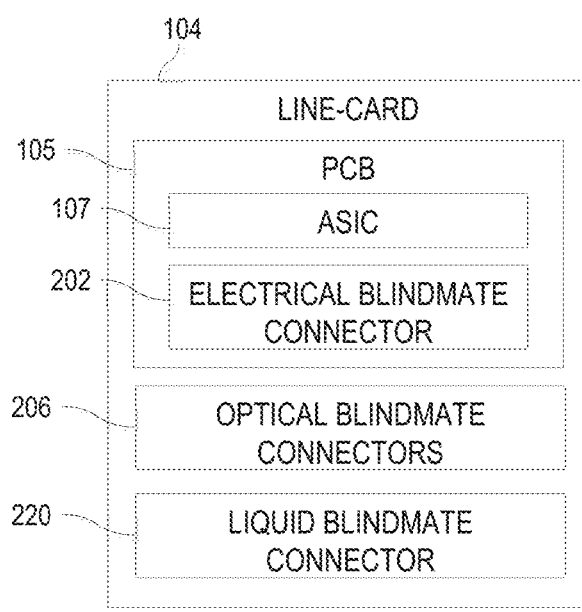
FIG. 1 is a block diagram of a line-card, according to an example.

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

Large-scale computing systems typically use thousands of interconnected nodes that collaborate to process tasks on multiple levels. The interconnected nodes can be configured to collaborate at the operating system level or to run as a cluster, for example, to allow multiple nodes to share the workload associated with processing incoming requests. The nodes in the computing system are connected together by network cables plugged into multiport switches at the node level that collectively establish the network topology of the computing system. The network cables are typically connected between ports of switches in specific configurations that allow for data transfer through the network topology.

The network cables interconnecting ports of the network devices have several disadvantages that negatively impact the performance and serviceability of the network topology. For example, network cables are removed from the switch connection ports to allow for service of the switch. Human error may cause connection issues during the repeated removal and reconnection of the network cables to the switch ports. In some other cases, network cables themselves could fail, which may call for replacement of the network cable terminating connector or even the network cable as a whole. If the network cable as a whole is replaced, often times operators will simply cut the ends off the damaged network cable and leave the cable inactive in the cable bundle, as replacing the network cable associated with a cable bundle can cause damage to other network cables running through walls, in cable trays, under raised floors, etc. and therefore exacerbate the initial problem of having one network cable not working properly. Over time this "cut and leave" practice results in multiple unused and unmarked network cables without end connectors taking up space in the topology infrastructure.

As mentioned above, a disadvantage of current network cable connection practice is the removal of network cables before repairing or replacing the network switch or components of the switch. As such, in a typical 40-port network switch with a technical failure, 40 network cables connected to the switch ports may be unplugged from their respective switch ports to allow for a new or repaired switch or switch component to be installed. Further, once the new or repaired switch or component is installed, the 40 network cables may then be reconnected to their respective switch ports to enable proper operation in the network topology. Errors, including human errors, can also occur during switch upgrades. In various circumstances, cable reconnection can be incorrect and the installation will not be fully operational. System downtime commonly translates into operational expenses and loss of revenues for organizations.

Therefore, the ability to repair or replace an internal component of a network switch without unplugging the associated network switch cable connections is desired.

Switch sub-chassis systems and methods for rack-scale servers are disclosed. In accordance with various aspects of the subject disclosure, a switch sub-chassis is provided for modular installation in a chassis (sometimes referred to as an enclosure), main chassis, blade chassis, or blade enclosure. The switch sub-chassis include structural support features that allow multiple hot-serviceable line-cards (e.g., each having one or more switch application-specific integrated circuits (ASICs)) and an integrated high-density optical fiber connectivity within the switch sub-chassis.

Various features of the disclosed switch sub-chassis and associated line-cards allow high power delivery to the ASICs of the line-cards directly from the midplane of the enclosure, allow efficient liquid cooling of the ASICs and corresponding electronics (e.g., including power regulators), allow liquid-electro-opto blindmate of the line-cards so that the line-cards are serviceable, allow high-density and complex fiber shuffle assemblies support, and facilitate ease of installation and/or servicing of fiber assemblies.

FIG. 1 is a line-card block diagram, according to an example. In an example, the line-card 104 may include a printed circuit board (PCB) 105. In another example, the line-104 card may include a tray, carrier, or some other structure to hold the PCB 105 (also referred to as a line-card carrier or line-card tray). The tray, carrier, or structure may include rails or guide features that allow for ease of insertion into a switch sub-chassis. The PCB 105 may include a socket, multiple sockets, or footprint. The socket or footprint may be formed to accept processors, GPU's, ASICs, or other networking related chips (for example, ASIC 202). The PCB 105 may include an electrical blindmate connector 222 at the back of the line-card 104. In an example, the electrical blindmate connector 222 may be disposed at the back end of the PCB 105, thus allowing the electrical blindmate connector 222 to mate with a corresponding connector located in the switch sub-chassis to provide power and/or management signals to the line-card 104. In another example, the line-card 104 may include an optical blindmate connector 206. The optical blindmate connector 206 may be disposed at or near the location of the electrical blindmate connector 222. In either example, the electrical blindmate connector 222 and the optical blindmate connector 206 may connect into corresponding connectors on a midplane or backplane of the switch sub-chassis or other similar computing devices. In yet another example, the line-card 104 may include a liquid blindmate connector 220. The liquid blindmate connector 220 may be coupled to a heat transfer device 221 via liquid lines 223. The heat transfer device 221 extracts heat from the ASIC 202. The liquid blindmate connector 220 may be disposed at or near the location of the optical blindmate connector 206. In either example, the electrical blindmate connector 222, the optical blindmate connector 206, and the liquid blindmate connector 220 may connect into corresponding connectors in the switch sub-chassis.

As used herein, a "computing device" may be a storage array, storage device, storage enclosure, server, desktop or laptop computer, computer cluster, node, partition, virtual machine, or any other device or equipment including a controller, a processing resource, or the like. In examples described herein, a "processing resource" may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Any machine-readable storage medium described herein may be non-transitory.

As used herein, "hot plug" may refer to the act of adding a component or components to a system while the system is powered on and/or running. Further, hot plug may include the continued operation of the system without significant interruption when the component or components are added. In other words, a device may be added to a system while the system is operating and the user or the system itself may perform an administrative task, so that the added device can be utilized. Hot plug may also be referred to with terms such as, hot pluggable, hot plugging, or hot pluggability. For example, a device may be noted to be "hot pluggable".

As used herein, "hot swap" may refer to the act of replacing, removing, or adding a component or components while the system is powered on and/or running. Further, hot swap may include the continued operation of the system without interruption. In other words, in response to a hot swap operation (for example, replacing one device with a new device), a system may operate as normal without interruption. Hot swap may also be referred to with terms such as, hot swappable, hot swapping, or hot swappability. In other words, a device may be noted to be "hot swappable".

As used herein, "rack unit" or "U" may refer to the unit of measurement to define the height of a rack frame and the height of the equipment in a rack frame (such as, computing devices). Each rack unit may be equivalent to 44.50 millimeters or 1.75 inches. For example, a computing device, such as a rack server, may have a height of 2 U or 2 rack units (in other words, 89 millimeters or 3.5 inches).

As used herein, a "blade enclosure" or "blade chassis" may refer to an enclosure or chassis which may accept various computing devices. For example, a blade enclosure may be a metal chassis with a midplane disposed in, approximately, the middle of the blade enclosure. The midplane may include various connections and traces. In such examples, the blade enclosure may accept computing systems (such as, blade servers or half-height blade servers), storage sub-chassis', and/or management modules in the front. The blade enclosure may accept power supplies, cooling devices (such as fans or liquid cooling interfaces), switches, interconnects, management modules, module 100, and/or other computing devices. A blade enclosure may be equivalent to 10 U. As used herein, a "blade server" may refer to a computing device of a different height, depth, and width than that of a standard rack server. The blade server, as described above, may rack or be inserted into the front of a blade enclosure. The blade server may offer the same functionality as a rack server, but in a smaller form factor.

As used herein, a "midplane" may refer to a PCB with connections disposed on the front of the PCB and the back of PCB. The midplane may include connections for computing devices and peripherals, such as power supplies, cooling devices, interconnects, switches, management modules, and/or other computing devices. The midplane may include cutouts or apertures to allow air to flow through a chassis or enclosure (for example, airflow through a blade enclosure). The cutouts or apertures on a midplane may allow a set of computing devices disposed at the front of the midplane to directly connect to another set of computing devices or a set of switch devices disposed on the rear of the midplane within the same blade enclosure. The direct connections through a midplane may use electrical connectors, optical connectors or a mix of electrical and optical connectors. A computing device disposed at the front of a midplane may connect to the midplane as well as to switch devices disposed at the rear of the midplane. A switch device disposed at the rear of a midplane may connect to the midplane as well as to computing devices disposed at the front of the midplane. In an example, a blade enclosure may include a midplane. The midplane may be disposed in the middle of the blade enclosure. In an example, the front of the midplane may include connections for a plurality of blade servers. In a further example, the back of the midplane may include connections for other peripheral devices. The midplane may include routing or tracing/traces to connect the components connected via the front of the midplane to the components connected via the back of the midplane.

Figure 2:
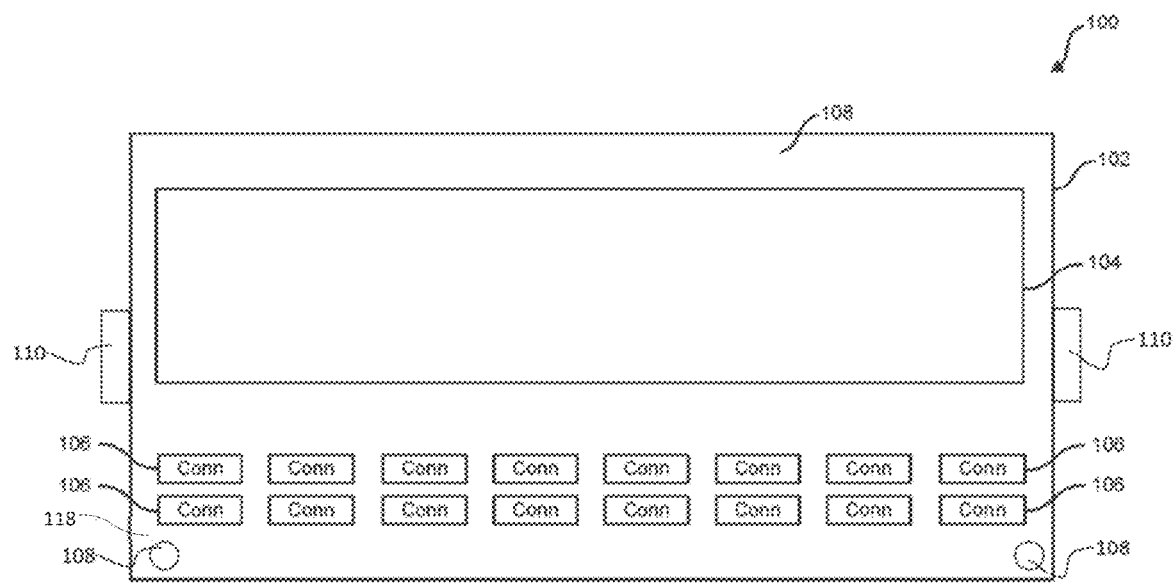
FIG. 2 is a block diagram of a faceplate front view of a switch sub-chassis, according to an example.

FIG. 2 is a block diagram of a faceplate view of a switch sub-chassis, according to an example. The disclosed switch provides a hot-swappable solution for network switches that allows for replacement of network switches or network switch components without disconnecting network cables connected to the switch. The disclosed switch decouples switch faceplate network cable connectors from internal components of the network switch so that, for example, the switch ASIC board or module is provided in a hot-swappable line-card that can be removed from the switch without disconnecting the switch network cables. This decoupling is achieved by providing a switch sub-chassis with disconnectable internal optical blindmate connectors for connection between the faceplate network cable connectors and the line-card ASIC, internal liquid blindmate connectors for liquid cooling connections to installed line-cards, and features that allow internal blindmate electrical connections directly to the enclosure midplane. These modular blindmateable connections allow for line-cards (e.g., ASIC modules and other switch internal components) to be serviced (e.g., installed or repaired) without disconnecting network connection cables from the faceplate of the switch sub-chassis.

As noted above, FIG. 2 is a block diagram of a faceplate view of a switch sub-chassis 102, according to an example. In another example, the switch sub-chassis 102 may be configured to be mounted in an enclosure. In a further example, the switch sub-chassis 102 may be configured to be mounted in a blade enclosure in a server rack for coupling of switch 100 to blade servers mounted in the blade enclosure. As shown in FIG. 2, switch sub-chassis 102 may include fluid ports 108 and mounting structures 110 (sometimes referred to herein as sub-chassis mechanical retention features) for securing switch sub-chassis 102 to an enclosure that contains blade servers and shared resources, such as a power/management midplane or backplane, power supplies, enclosure management devices, storage drives, etc. In one example, the fluid ports 108 may be on the faceplate 118 as shown in FIG. 2, where they connect to system fluid lines outside an enclosure (not shown). In other examples, the fluid ports 108 may be connected to system fluid lines inside an enclosure and not visible on the faceplate 118.

As shown in FIG. 2, switch sub-chassis 102 may include a faceplate 118 having a plurality of network cable connection ports 106. The faceplate 118 may also include one or more labels and/or one or more indicators such as light-emitting diodes and light pipes that illuminate to indicate designations for the connectors 106. In another example, a single line-card 104 may be removably positioned within the switch sub-chassis 102 (e.g., in a slot in the switch sub-chassis 102). Line-card 104 may be slidably received in (and removed from) the switch sub-chassis 102 (e.g., by inserting the line-card 104 into the line-card slot in switch sub-chassis 102 along an axis that is perpendicular to the faceplate 118 of the switch sub-chassis 102). The line-card slot in the switch sub-chassis 102 may be formed by a recess that is sized and configured to receive the line-card 104 therein. In another example, network cable connectors 106 may include receptacle connector portions of network connectors, such as MPO type optical cable connectors. Other types of network cable connectors 106, such as MXC or LC Duplex optical fiber cable connectors, may be used to connect to other devices in a computer network topology. Further, other non-optical network cable connectors may be utilized, such as RJ45 connectors.

Figure 3:
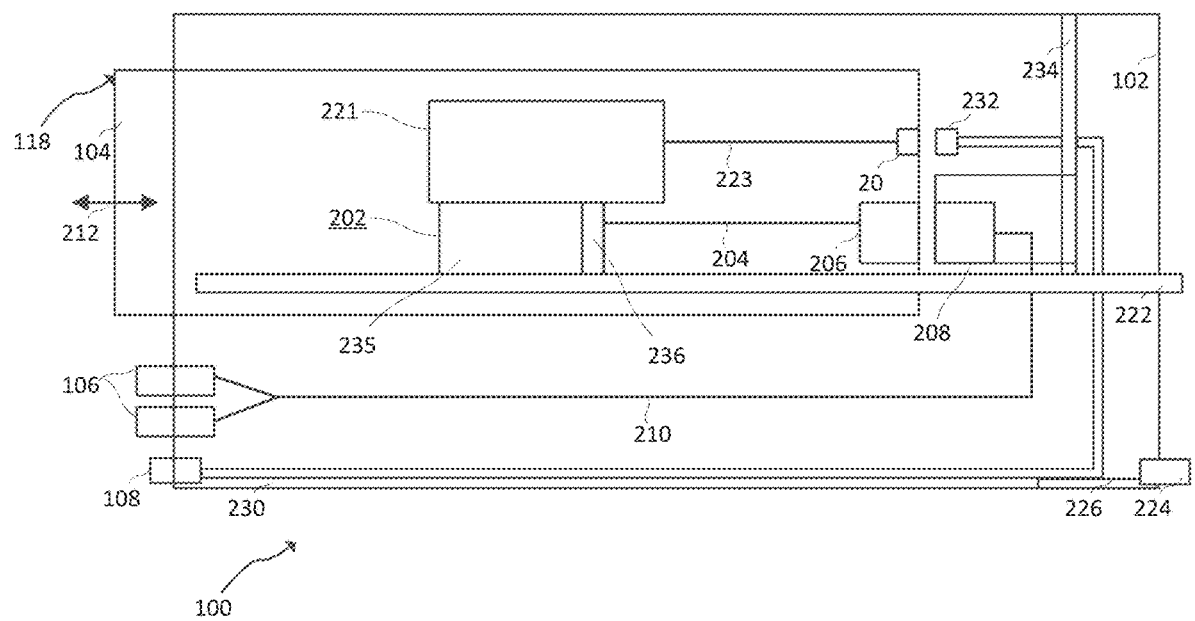
FIG. 3 is a block diagram of a side view of a switch sub-chassis, according to an example.

FIG. 3 is a block diagram of a side view of a switch sub-chassis, according to an example. The side schematic view of switch 100 shows line-card 104 partially inserted into the switch sub-chassis 102 in the direction of arrows 212, which may be perpendicular to the faceplate 118 of the switch sub-chassis 102. As shown in the example of FIG. 3, line-card 104 may include an ASIC 202 that is connected to an electrical blindmate connector 222 via an electrical communication link. The electrical communication link may, for example, include a multichannel electrical signal transmission medium configured to communicate electronic signals between the ASIC 202 and line-card electrical blindmate connector 222. The ASIC 202 may also be connected to an optical blindmate connector 206 via an optical communication link 204. The optical communication link may, for example, include a multichannel optical signal transmission medium configured to communicate optical signals between the ASIC 202 and line-card optical blindmate connector 206.

In another example, optical blindmate connector 206 may blindmate with a switch sub-chassis optical blindmate connector 208. Switch sub-chassis optical blindmate connector 208 may be coupled via optical fibers 210 to connectors 106 at the faceplate 118 of switch sub-chassis 102.

In another example, electrical blindmate connector 222 may extend beyond optical blindmate connector 206 and pass through and/or under one or more structures of switch sub-chassis 102 for direct electrical blindmate connection to an enclosure midplane as described in further detail hereinafter.

In another example, optical blindmate connector 208 may be mounted to a fence bracket 234. The fence bracket 234 may be located between faceplate 118 and front-end bulkhead 119 of switch sub-chassis 102. Fence bracket 234 may include features such as notches and/or cutouts that allow electrical blindmate connector 222, liquid blindmate connector 220, and/or switch sub-chassis liquid blindmate connector 232 to pass through and/or under the fence bracket when a line-card 104 is installed in the switch sub-chassis 102. In another example, the fence bracket 234 may include a shoulder for alignment with the switch sub-chassis 102 and a shoulder ramp to hold the line-card 104 PCA in position within the switch sub-chassis 102 after the line-card 104 is fully inserted into the switch sub-chassis 102.

As shown in FIG. 3, line-card 104 may include a liquid blindmate connector 220 configured to blindmate with a switch sub-chassis liquid blindmate connector 232 that is fluidly coupled, by fluid supply lines 230, with fluid port 108 for fluid connection to liquid lines of a server rack. Also as shown in FIG. 3, also shows how switch sub-chassis 102 may be provided with a sub-chassis management circuitry 226. Sub-chassis management circuitry 226 may be coupled to a connector 224 for direct electrical blindmate to the enclosure midplane, computing devices mounted in the enclosure, or one or more blade servers mounted in the enclosure. Switch sub-chassis 102 may include additional interior and/or exterior connectors as described in further detail hereinafter.

Sub-chassis management circuitry 226 may include a management board and/or one or more management controllers (e.g., ASICs) that communicate, via connector 224, with enclosure managers about line-cards, fiber shuffles, and/or leak detection (e.g., via a drip pan and sensor rope as described in further detail hereinafter).

Line-card 104 may be inserted into switch sub-chassis 102 in the direction of arrows 212 from the faceplate 118 toward the front-end bulkhead 119. Line-card 104 may be removed from the switch sub-chassis 102 in the direction of arrows 212 away from the front-end bulkhead 119 toward the faceplate 118. Mechanical guide features positioned within the switch sub-chassis 102 may guide the insertion and removal process. The mechanical guide features may be configured to facilitate proper blindmate connection between the liquid, electrical, and/or optical blindmate connectors and line-card 104. A Handle latch on line-card 104 may be configured to latch and hold the line-card 104 in place to maintain reliable connections for the electrical blindmate connector 222 to corresponding electrical connectors on midplane, the optical blindmate connector 206 to corresponding optical connector 208 on fence bracket 234, and the liquid blindmate connector 220 to corresponding liquid connector 232 in sub-chassis 102. Handle latch may also be used to unlatch to remove the line-card 104 from sub-chassis 102. In another example, the handle latch may be located on either side of the line-card 104. In another example, the line-card 104 may include two handle latches. In another example, the handle latch may maintain the blindmate connector 222 to corresponding electrical connectors on midplane, the optical blindmate connector 206 to corresponding optical connector 208 on fence bracket 234, and the liquid blindmate connector 220 to corresponding liquid connector 232 in sub-chassis 102.

In another example, the line-card's 104 electrical blindmate connector 222, the optical blindmate connector 206, and the liquid blindmate connector 220 may be configured to allow the line-card to mate the noted connectors reliably and in an order. For example, the liquid blindmate connector 220 may mate to the corresponding liquid connector 232 in sub-chassis 102 first, the optical blindmate connector 206 may mate to the corresponding optical connector 208 on fence bracket 234 second, and then the electrical blindmate connector 222 may mate to the corresponding electrical connectors on the midplane.

In an example, connectors 222 and 224 may be positioned at or near the front-end bulkhead 119 of switch sub-chassis 102, where at or near the front-end bulkhead 119 is defined as being closer to the front-end bulkhead 119 than the faceplate 118. Similarly, faceplate connectors 106 and liquid ports 108 are positioned at or near the faceplate 118 of switch sub-chassis 102, where at or near the faceplate 118 is defined as being closer to the faceplate 118 than the front-end bulkhead 119.

In an example, line-card 104 may be a liquid-cooled electrical, optical, or a combination of electrical and optical ASIC module. For example, the line-card 104 may be a combination of an electrical and optical ASIC module. In such examples, the ASIC chip 202 may comprise an electrical/optical conversion portion 236 and a logic portion 235. Further, the electrical/optical conversion portion 236 and the logic portion 235 may be in the same package (as in, one chip) or be separate packages (as in, more than one component, all components being disposed on the line-card 104 motherboard). In an example, the ASIC chip 202 may be configured to output electrical signals that are converted into an optical signal before leaving the switch sub-chassis 102. For example, an optical transceiver may be positioned in the signal communication path at a location between the ASIC chip 202 and the line-card optical blindmate connector 206. In such examples, the optical transceiver may be configured to receive an electrical signal at an input and output a corresponding optical data signal that continues to propagate through the remainder of the signal transmission path as an optical signal.

The optical transceiver, also called fiber optic transceiver or optical transceiver module, used in high-bandwidth signal communication applications. Optical transceivers may include an electrical interface on one side and an optical interface on the other side so that signals passing through the optical transceiver may be converted from electrical to optical or optical to electrical depending on the signal's direction of travel. Therefore, an optical transceiver may operate as an opto-electronic converter that converts an electrical signal into an optical signal or an optical signal into an electrical signal. In an example in which ASIC chip 202 outputs electrical signals, an optical transceiver may be positioned anywhere in the signal path between ASIC chip 202 and the line-card optical blindmate connector 206.

As noted above, line-card 104 may be an all optical module. For example, ASIC chip 202 may include a high-density optical engine under cold-plates that outputs an optical signal that is received by an internal line-card communication link and communicated to connector 206. The optical signal may be further communicated through optical connectors 206 and 208, and through an optical communication link 210 to optical network cable connectors 106 and/or other optical connectors of the switch sub-chassis.

In the examples noted above and shown in FIGS. 2 and 3, line-card 104 may be decoupled from the network cable connectors 106 on the faceplate 118 of the switch sub-chassis 102. In such examples, the line-card 104 may be removed from switch sub-chassis 102 without disconnecting signal communication cables or wires that may be connected to network cable connectors 106. As such, the examples illustrated in FIGS. 2 and 3 may allow for a line-card 104 to be repaired or replaced without removing corresponding network cable connectors that communicate signals to and from line-card 104.

Figure 4:
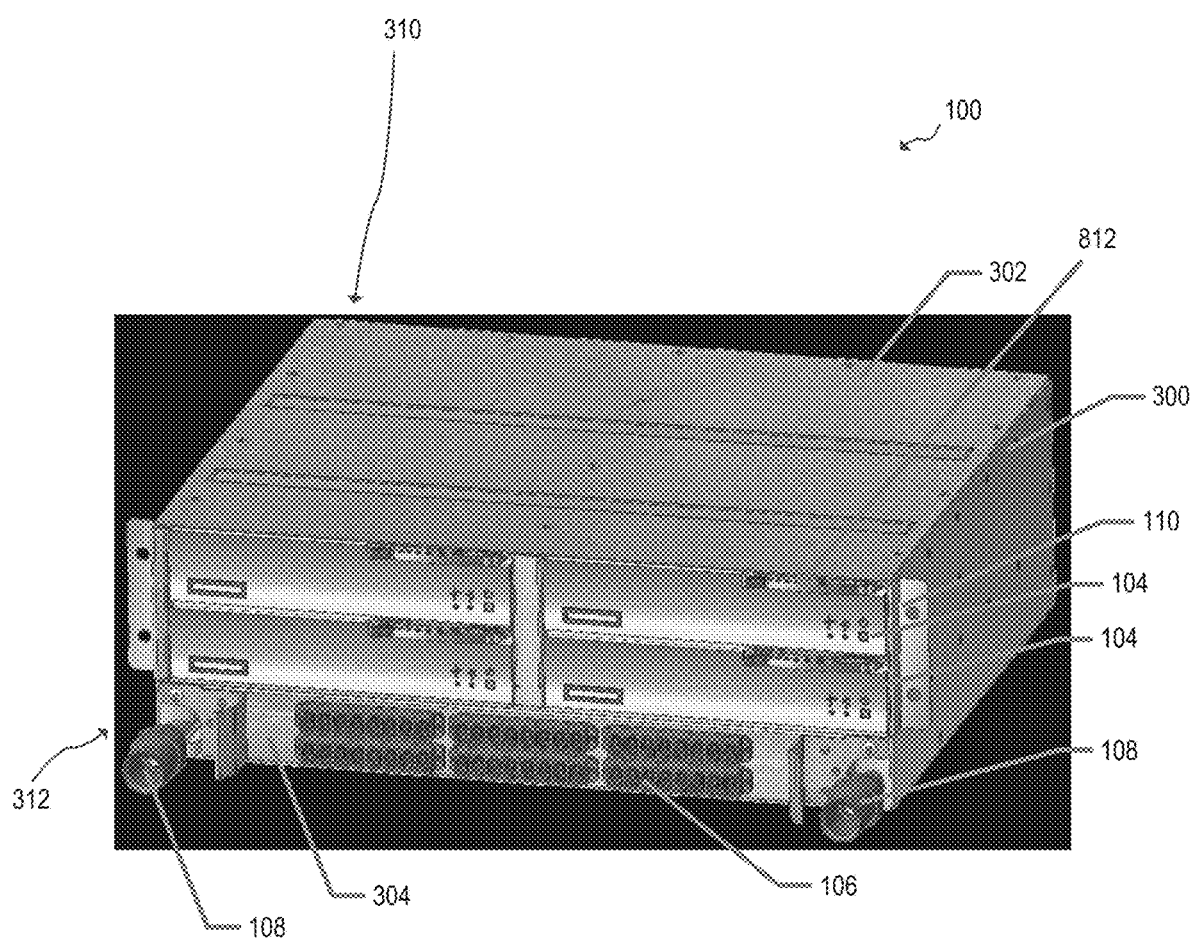
FIG. 4 is a schematic view of a switch sub-chassis, according to an example.

FIG. 4 is a schematic view of a switch sub-chassis 100, according to an example. In an example, the switch sub-chassis 100 may include four removable line-cards 104 (e.g., each similar to line-cards 104 shown in FIGS. 2 and 3). Each line-card 104 may include one, two, or more than two switch ASICs packaged. One or multiple line-cards 104 may be installed in one field serviceable switch sub-chassis (for example, switch sub-chassis 100). In an example, network cable connectors 106 may be positioned on a rear side 312 (corresponding to faceplate 304) of a switch sub-chassis 100 having an outer surface formed by a base pan 300 and a lid 302. A front side 310 (corresponding to front-end bulkhead) may include various blindmate connectors as described in further detail hereinafter. Sub-chassis mechanical retention features 110 may be formed on or attached to base pan 300 (for example, one ear on a rear-end of each of two sidewalls of base pan 300 as shown with openings for receiving mounting screws or other attachment elements) for securing the base pan to a main chassis, a rack, or an enclosure. In an example, the four serviceable line-cards 104 may be removably positioned in the switch sub-chassis 100 at a position above (respectively) the network connectors 106, which are mounted on a faceplate 304. Faceplate 304 and fluid ports 108 are disposed at the rear side 312 of switch sub-chassis 102.

In an example, line-cards 104 are independently removable from the switch sub-chassis 100 utilizing the line-card handle latch 812. In such examples, any one or more of line-cards 104 may be removed from the switch sub-chassis without disconnecting any of data transmission cables or wires that may be connected to the network cable connectors 106.

Figure 5:
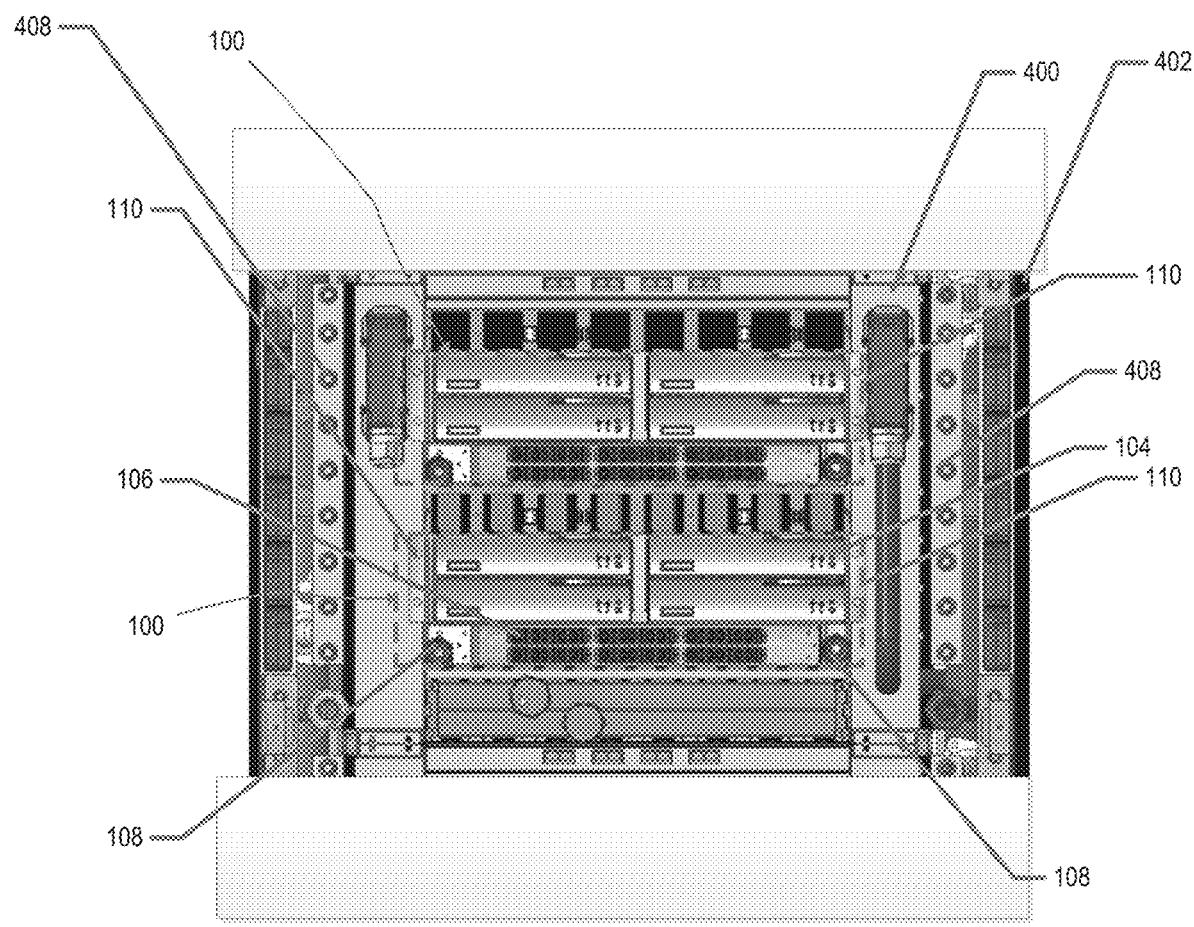
FIG. 5 is a schematic view of two switch sub-chassis installed in the rear of a chassis in a rack, according to an example.

FIG. 5 is a schematic view of two switch sub-chassis 100 installed or mounted in the rear of a chassis in a rack, according to an example. As shown, mounting structures 110 of switch sub-chassis 100 may attach the switch sub-chassis 100 to a main chassis 400 in a server rack 402. In an example, rack liquid lines 408 may be fluidly coupled to liquid ports 108 of each of the switch sub-chassis 100.

Figure 6:
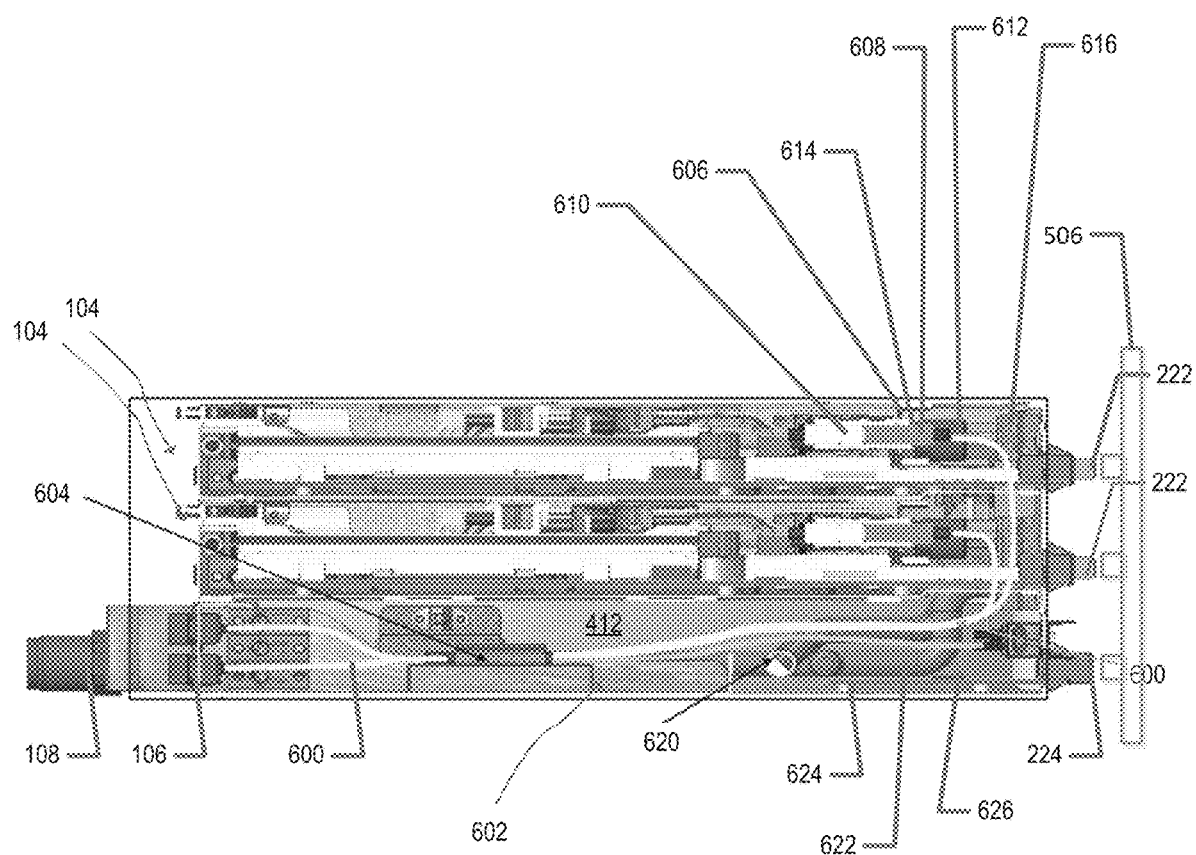
FIG. 6 is a schematic view of a cross section of a switch sub-chassis, according to an example.

FIG. 6 is a schematic view of a cross section of a switch sub-chassis 100, according to an example. In an example, the switch sub-chassis 100 may include four line-cards 104 but only two are visible in the cross-sectional view. FIG. 6 illustrates a cross-sectional side view of a switch 100 having four line-cards 104 installed therein. In an example, the switch sub-chassis 100 may be a modularly blindmateable switch sub-chassis that includes a sub-chassis management board 624 having a management controller 626 (e.g., an ASIC) and having a management board connector 224 for direct blindmate to a midplane 506 of an enclosure 400. In another example, connectors 106 may be implemented as (e.g., external) faceplate optical connectors in a fiber shuffle tray 412 (e.g., on a faceplate of the fiber shuffle tray). In such example, line-cards 104 may be installed in corresponding line-card slots, each including optical blindmate connectors 608 (e.g., implementations of connectors 208 of FIG. 3), and liquid blindmate connectors 612 (e.g., implementations of connectors 232 of FIG. 3) for a line-card 104.

Faceplate liquid ports 108 may be fluidly coupled to the liquid blindmate connectors 612 via fluid lines 230 (e.g., including a fluid supply line 620 and a fluid return line 622). Liquid blindmate connectors 612 for each line-card may be disposed in a manifold 616 for that line-card and at least one other line-card. Liquid manifolds 616 may be part of a liquid line assembly and may be modularly attached to a front-end bulkhead of the base pan (as described in further detail hereinafter).

In another example, fibers 600 may be provided in the fiber shuffle tray 412 and coupled between the faceplate optical connectors 106 and the optical blindmate connectors 608 for each of the line-card slots. A shuffle stand 602 may include one or more fiber shuffle assemblies 604 that guide fibers 600 between connectors 106 and optical blindmate connectors 608. In an example, line-cards 104 may be considered to be fully installed in the switch sub-chassis 102, such that line-card liquid blindmate connectors 614 (e.g., implementations of connectors 220 of FIG. 3) are fluidly coupled to switch sub-chassis liquid blindmate connectors 612, line-card optical blindmate connectors 610 (e.g., implementations of connectors 206 of FIG. 3) are optically coupled to optical blindmate connectors 608 on fence bracket 606, and it can be seen that management board electrical connectors 224 and line-card electrical connectors 222 protrude from the front bulkhead of switch sub-chassis 102 in this configuration for direct blindmate to the enclosure midplane 506 (shown in FIG. 6).

In an example, optical blindmate connectors 608 may be mounted on Fence brackets 606. In another example, management board connector 224 may be disposed at or near a front of the modularly blindmateable switch sub-chassis. In another example, faceplate optical connectors 106 and faceplate liquid ports 108 may be disposed at or near a rear of the modularly blindmateable switch sub-chassis. In another example, fence bracket 606 may be disposed between the front and the rear of the modularly blindmateable switch sub-chassis.

Figure 7:
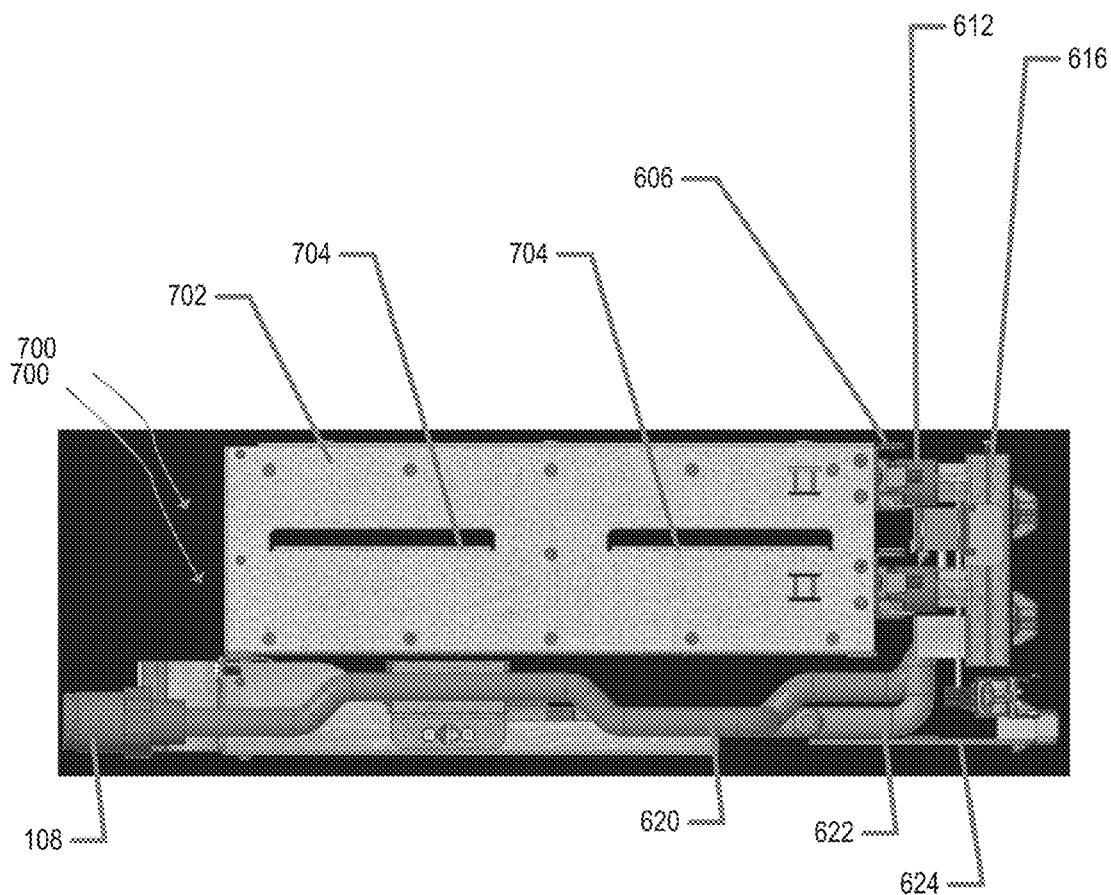
FIG. 7 is another schematic view of a cross section of a switch sub-chassis, according to an example.

FIG. 7 is another schematic view of a cross section of a switch sub-chassis where line-cards and a fiber shuffle tray has been removed, according to an example. In an example, the line-card cage assembly 702 (and/or the line-card slots 700) may include guide features 704 to guide line-cards 104 for optical, liquid, and electrical blindmate connections to switch sub-chassis 102, enclosure midplane 506, and/or blade servers 502. Liquid supply line 620 and liquid return line 622 may be run between faceplate fluid port(s) 108 and manifold 616, which may house switch sub-chassis liquid blindmate connectors 612. A fence bracket 606 may also be included in line-card cage assembly 702. In another example, the switch sub-chassis 102 may include a sub-chassis management board 624.

Figure 8:
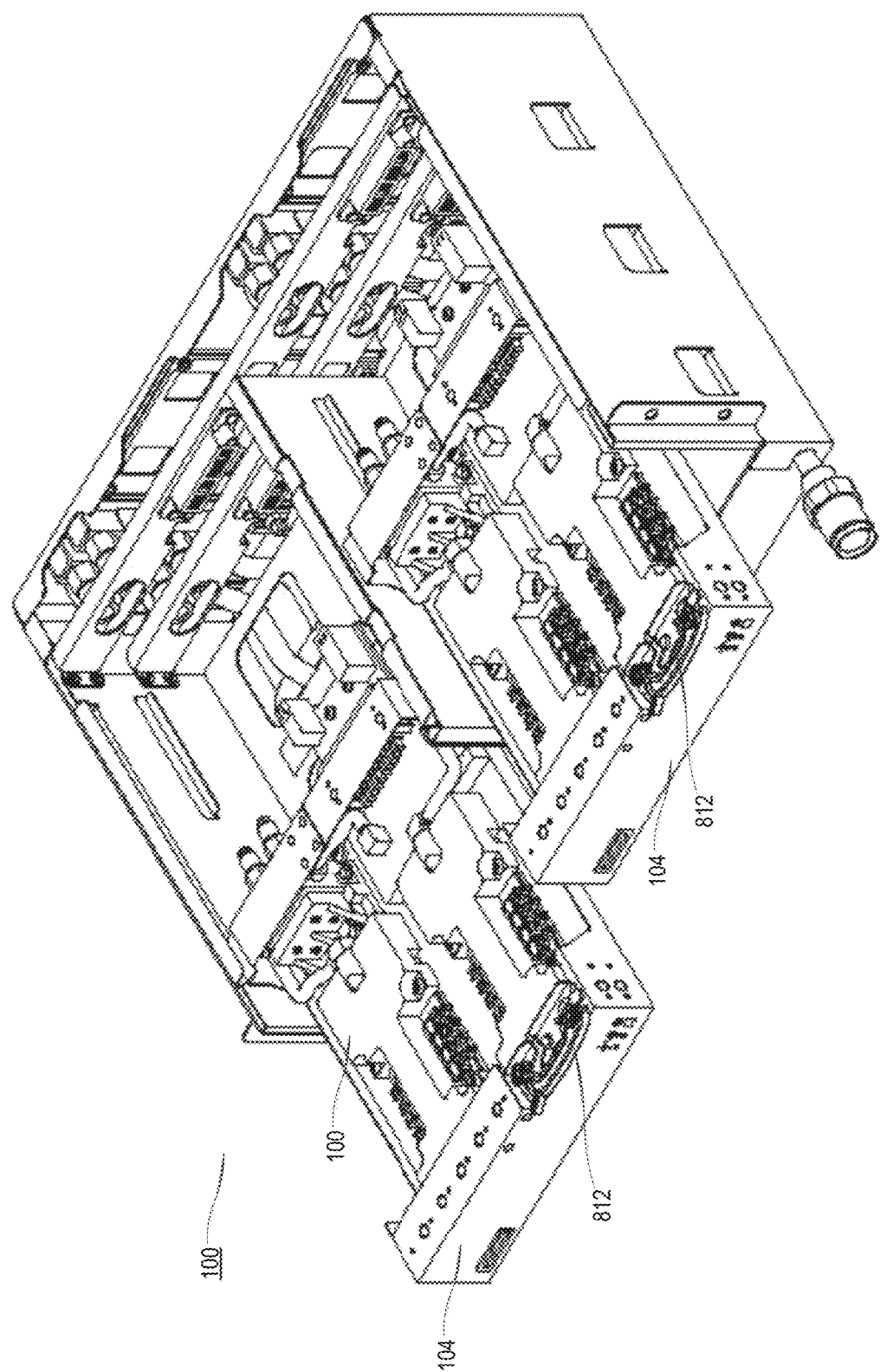
FIG. 8 is a schematic view of a switch sub-chassis, with partially extended line-cards, according to an example.

FIG. 8 is a schematic view of a switch sub-chassis 100, with partially extended line-cards 104, according to an example. As described above, the switch sub-chassis 100 may allow for insertion of one or more line-cards 104. In an example, the line-cards 104 may comprise a PCB and a carrier or line-card carrier. The carrier may allow for insertion of the line-card 104 into the switch sub-chassis 100. The carrier may also include a handle latch 812 to allow for ease of insertion and removal of the line cards 104. In another example, the carrier may include guide features formed along the side of the line-cards 104 to correspond to guide features located in the switch sub-chassis 100. There corresponding guide features may allow for ease of insertion of line-cards 104 and allow for proper insertion of the line-cards 104 given potential variances in connectors. In another example and as noted, the switch sub-chassis 100 may include one, two, or more line-cards 104.

Figure 9:
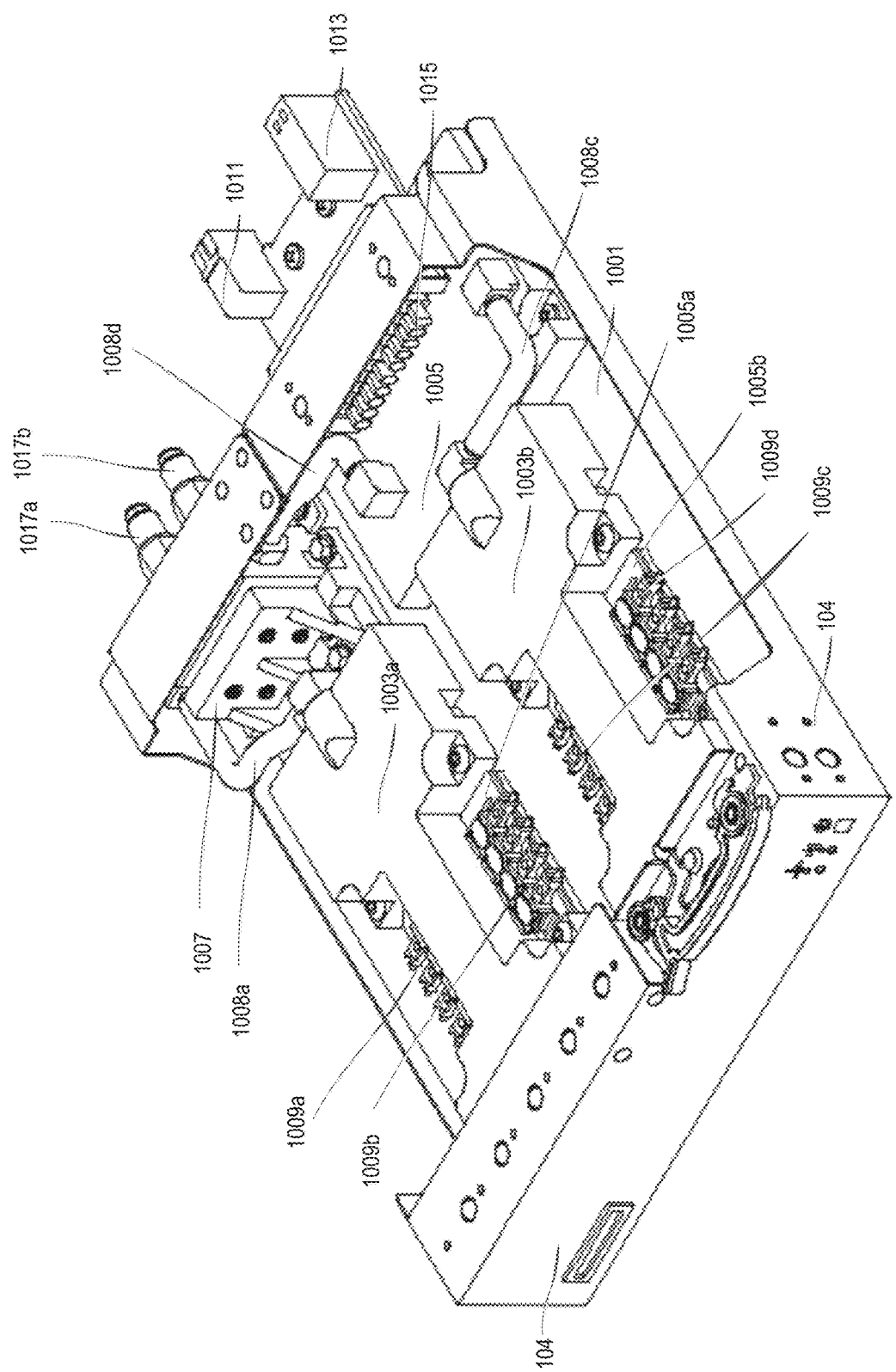
FIG. 9 is a schematic view of a line-card, according to an example.

FIG. 9 is a schematic view of a line-card 104, according to an example. The PCB 1001 of the line-card 104, as described above, may include one or more ASICs 1005a, 1005b. In a further example, cold plates 1003a, 1003b may be situated or positioned over the ASICs 1005a, 1005b, respectively. In such examples, the cold plate 1003a may receive cooling liquid from the flexible liquid line 1008a coming from the floating water block assembly 1007. Liquid from cold plate 1003a may then be moved to the cold plate 1003b via flexible liquid line (not shown). Liquid may then be moved from the cold plate 1003b to the cold plate 1005 via the flexible liquid line 1008c, and then to the floating water block 1007 via the flexible liquid line 1008d. As the liquid moves from one cold plate to another, the liquid may be heated. In other words, the liquid may extract heat from ASICs 1005a, 1005b and components under the coldplate 1005. In such examples, the floating water block assembly 1007 may connect to sub-chassis liquid supply line via the liquid blindmate connection 1017a on one side and flexible liquid lines 1008a on the other side, while the floating water block assembly 1007 may connect to sub-chassis liquid return line via the liquid blindmate connector 1017b on one side and flexible liquid line 1008d on the other side.

In another example, the ASIC may include optical fiber jumpers 1009 (only partially shown in FIG. 9 where fiber segments between the ASICs 1005a, 1005b and the optical blindmate connector 1015 are omitted for clarity). In a further example, the optical fiber jumpers 1009 may allow for connection of optical blindmate connector 1015 to ASICs 1005a, 1005b. In another example, the line-card may include two ASICs 1005a, 1005b. In such examples, the ASICs 1005a, 1005b may be staggered on the PCB 1001. In other words, the ASICs 1005a, 1005b may be disposed on the PCB 1001 in such a way that the optical fiber jumper 1009b from one ASIC 1005a do not line up with the optical fiber jumper 1009c for an opposing ASIC 1005b. Stated another way, the ASICs 1005a, 1005b may be stagger-mounted to the PCB 1001 with a half chip ferrule pitch (to allow for cable clearance). A chip ferrule may be a component (such as a rigid boot) to align, stabilize and/or protect an end of a fiber jumper or cable. Such configurations may allow for optical fiber jumper 1009b to be attached to an ASIC 1005a without interfering with optical fiber jumper 1009c from an adjacent ASIC 1005b. In other words, when two adjacent ASICs 1005a, 1005b are closely and symmetrically placed on the PCB 1001, then optical fiber jumper 1009b may interfere with optical fiber jumper 1009c, due to the small amount of space on a line-card PCB 1001. On the other hand, if the ASICs 1005a, 1005b are staggered, then the optical fiber jumper 1009b may not interfere with optical fiber jumper 1009c. In another example, the line-card 104 may include fiber spools 810 (see FIG. 12). To ensure consistent lengths among the optical fiber jumpers 1009, fiber spools 810 may be strategically placed in various locations within line-card 104.

In another example, the PCB 1001 may include electrical blindmate connectors 1011, 1013, optical blindmate connectors 1015, and/or liquid blindmate connectors 1017a, 1017b. In such examples, the electrical blindmate connectors 1011, 1013 may provide power signals, management signals, data signals, or some combination thereof. For example, electrical blindmate connector 1011 may consist of a housing to accept a series of pins relating to management signals to connect to management connector on a midplane. In another example, electrical blindmate connector 1013 may consist of a housing to accept two large contacts to connect to power connector on a midplane, which may provide power and ground signals. The optical blindmate connectors 1015 may provide data signals. In another example, the liquid blindmate connectors 1017a, 1017b may be liquid quick disconnects. Further, the liquid blindmate connectors 1017a may include a supply connector, to provide cool or cold water to the line-card 104, and/or the liquid blindmate connectors 1017b may include a return connector, to send water back for cooling.

Figure 10:
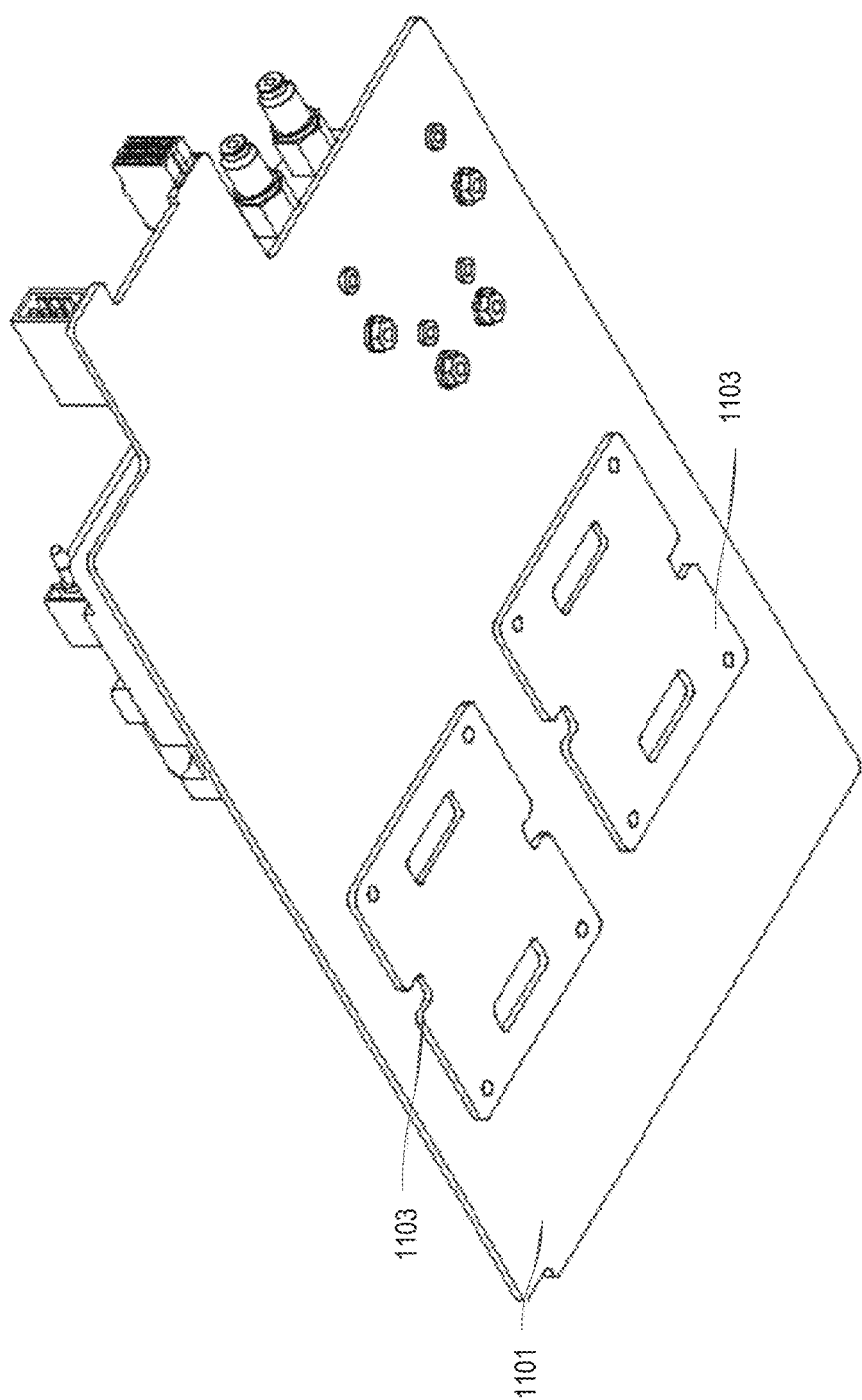
FIG. 10 is a schematic view of a bottom portion of a line-card, according to an example.

FIG. 10 is a schematic view of a bottom portion of a line-card, according to an example. In an example, the PCB 1101 of the line-card contained in the carrier may include one or more ASICs. In some examples, ASICs, when deposited or installed on a PCB, may cause warping. In an example, to prevent warping, bolster plates 1103 may be added to the bottom portion of the PCB 1101. In a further example, the bolster plates 1103 may be situated or positioned directly opposite or underneath the ASIC or ASICs. In an example, the bolster plate 1103 may be composed of metal, plastic, or some other material stiff enough to prevent PCB 1101 warping. In another example, the number of bolster plates 1103 may correspond to the number of ASICs installed on the PCB 1101. In other words, for each ASIC on the PCB 1101, a bolster plate 1103 may be installed. In yet another example, a common bolster plate 1103 may be used for all the ASICs installed on the PCB 1101.

Figure 11:
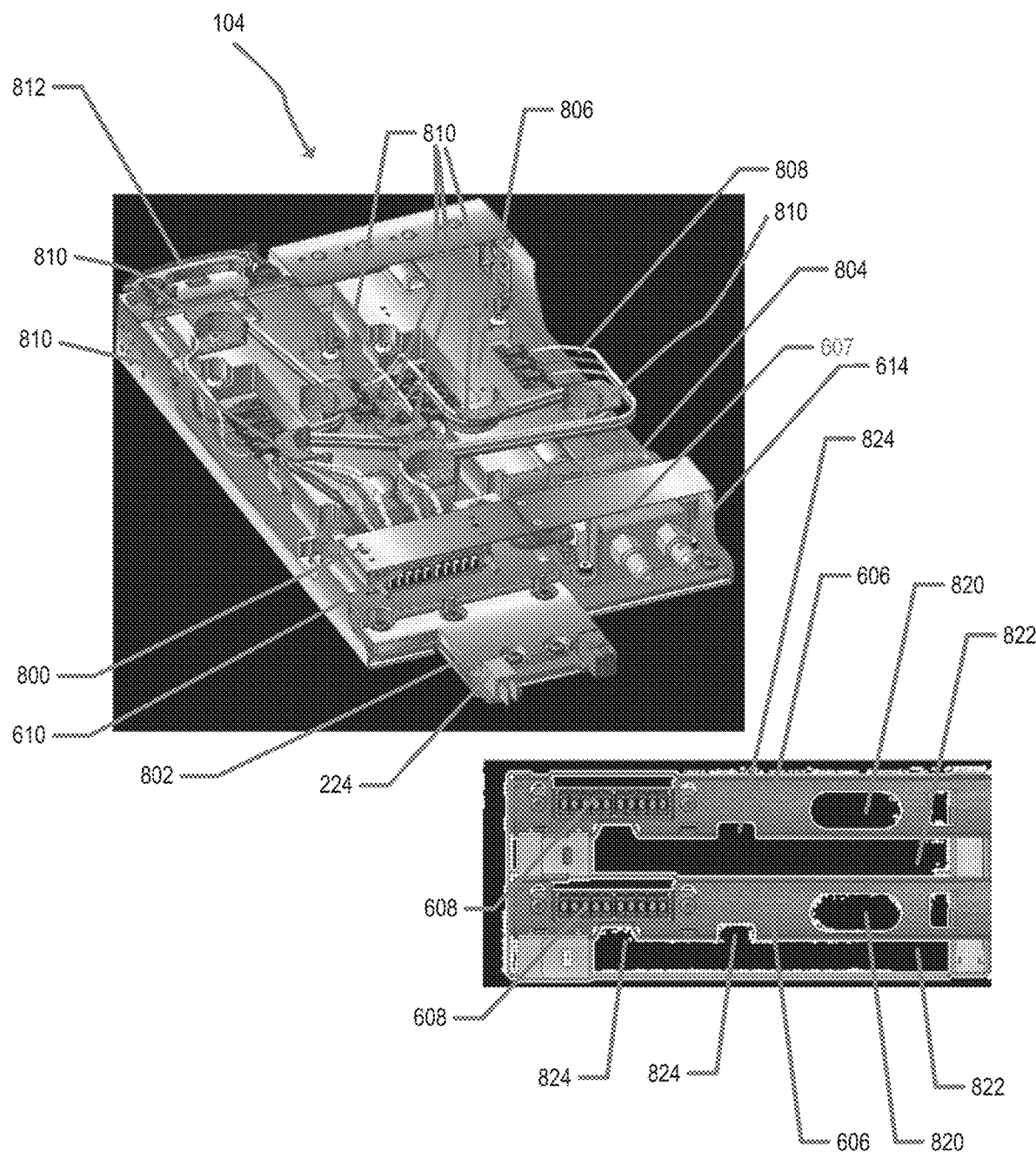
FIG. 11 is another schematic view of a line-card in alignment with a portion of a fence bracket of a switch sub-chassis, according to an example.

FIG. 11 is another schematic view of a line-card 104 in alignment with a portion of a fence bracket 606 of a switch sub-chassis, according to an example. In an example, fence bracket 606 may include a cutout 822 for each of the two of the line-card slots 700 of, for example, FIG. 8. In an example, each cutout 822 may be configured to allow a PCB extension 802 of a line-card 104 to pass under and beyond the fence bracket 606 for direct electrical blindmate of the line-card 104 to the midplane 506 of the enclosure 400. In such examples, cutouts 822 may each include notches 824 that allow multiple line-card electrical connectors 224, to pass under and beyond fence bracket 606, on an extension 802 that also passes into cutout 822 under fence bracket 606.

In another example, line-card 104 may include a handle latch 812, and a bracket 800 for line-card optical connector 610 to be disposed on the underside. The line-card liquid blindmate connectors 614 disposed on the floating water block assembly 607 are arranged to pass through corresponding holes 820 in fence brackets 606 on one side, and coupled to cold plate 806 for ASICs 202 (see FIG. 3) via the floating water block assembly 607 and flexible fluid lines 804. In another example, line-card 104 may include optical fiber jumpers 808 and fiber spools 810 for guiding optical fiber jumpers 808 between ASICs 202 and line-card optical blindmate connector 610. In an example, switch sub-chassis optical blindmate connectors 608 may be mounted on fence bracket 606.

Figure 12:
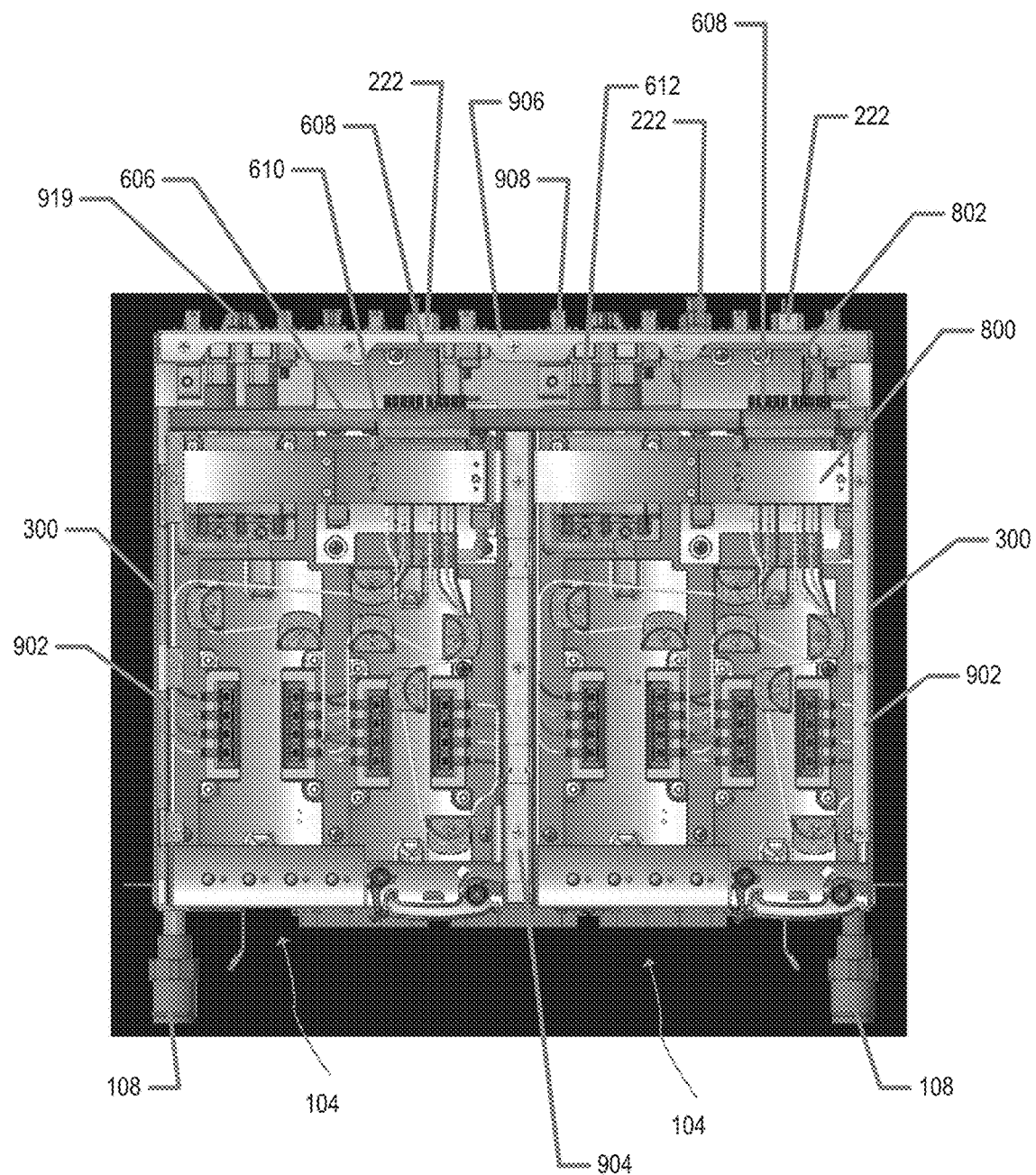
FIG. 12 is a top-down schematic view of a switch sub-chassis with two line-cards, according to an example.

FIG. 12 is a top-down schematic view of a switch sub-chassis with two line-cards with lid 302 removed, according to an example. In an example, line-card cage assembly 902 (e.g., an implementation of line-card cage assembly 702 of FIG. 7) may be mounted in base pan 300 having a front-end bulkhead 906 (e.g., an implementation of front-end bulkhead 119 of FIG. 3) that includes initial alignment features 919 (sometimes referred to herein as initial guide features or sub-chassis initial alignment features) for mechanical blindmate of the base pan to the enclosure midplane 506 for installation of switch sub-chassis 100 in an enclosure, and includes optical blindmate connectors 908 attached to the front-end bulkhead 906, for optical blindmate to blade servers 502. In another example, line-card electrical blindmate connectors 222 may protrude through front-end bulkhead 906 of base pan 300. Fence bracket 606 can also be seen extending across the line-card cage assembly, and bridge brackets 904 can also be seen attaching side-by-side portions of the line-card cage assembly. In such configurations, extension 802 of each line-card 104 may be seen extending under and beyond fence bracket 606. Front-end bulkhead optical blindmate connectors 908 may be implementations of optical blindmate connectors.

Figure 13:
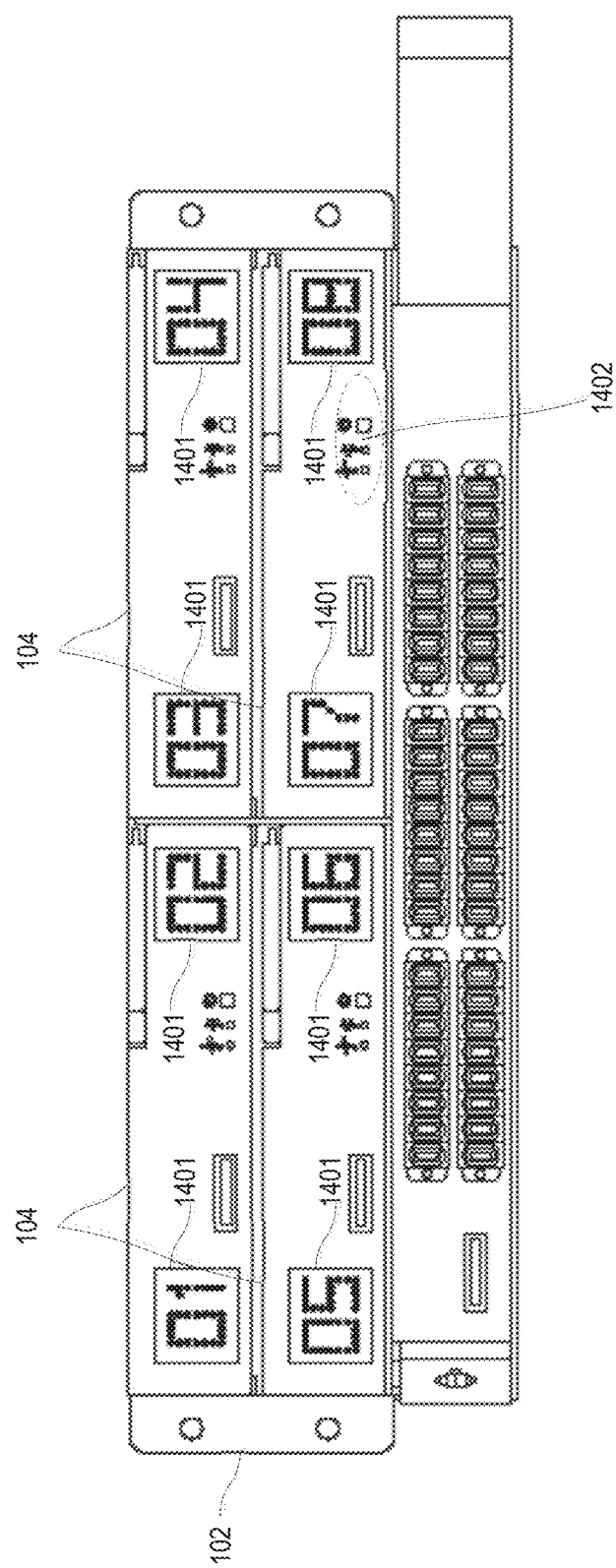
FIG. 13 is a schematic view of the front portion of a switch sub-chassis, including four line-cards and a shuffle tray, according to an example.

FIG. 13 is a schematic view of the front of a different example of a switch sub chassis 102. In such examples, line-cards 104 may include displays 1401 and indicators 1402. In such examples, the displays 1401 may convey information to users. For example, the displays 1401 may convey a number identifying or indicating a switch ASIC order number on a line-card 104. In another example, the display 1401 may convey a short or abbreviated error message. In yet another example, the display 1401 may not display anything (e.g., when the switch ASIC is not present or not operational.) The display 1401 may convey different errors and levels of severity based on color, numbers, letters, blinking, or some combination thereof. In another example, the display 1401 may include segments of light bars, a series of LEDs, a graphical LCD, or some other device to display information. In an example, the indicators 1402 may convey system status information, such as power on/off, overall operational health of a line-card 104, etc.

Figure 14A:
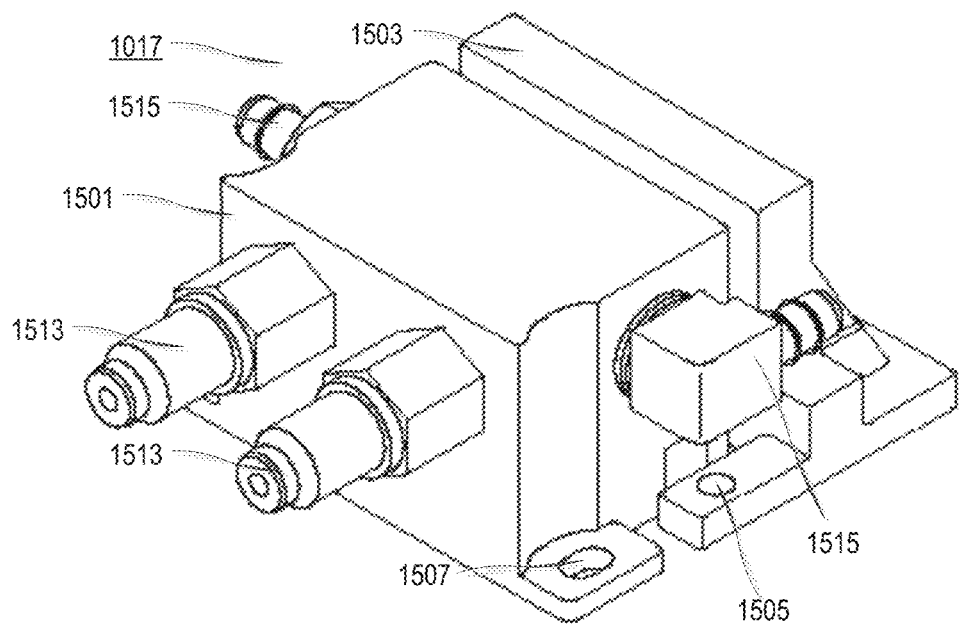
FIGS. 14A, 14B, and 14C are schematic views of a water block, according to an example.
Figure 14B:
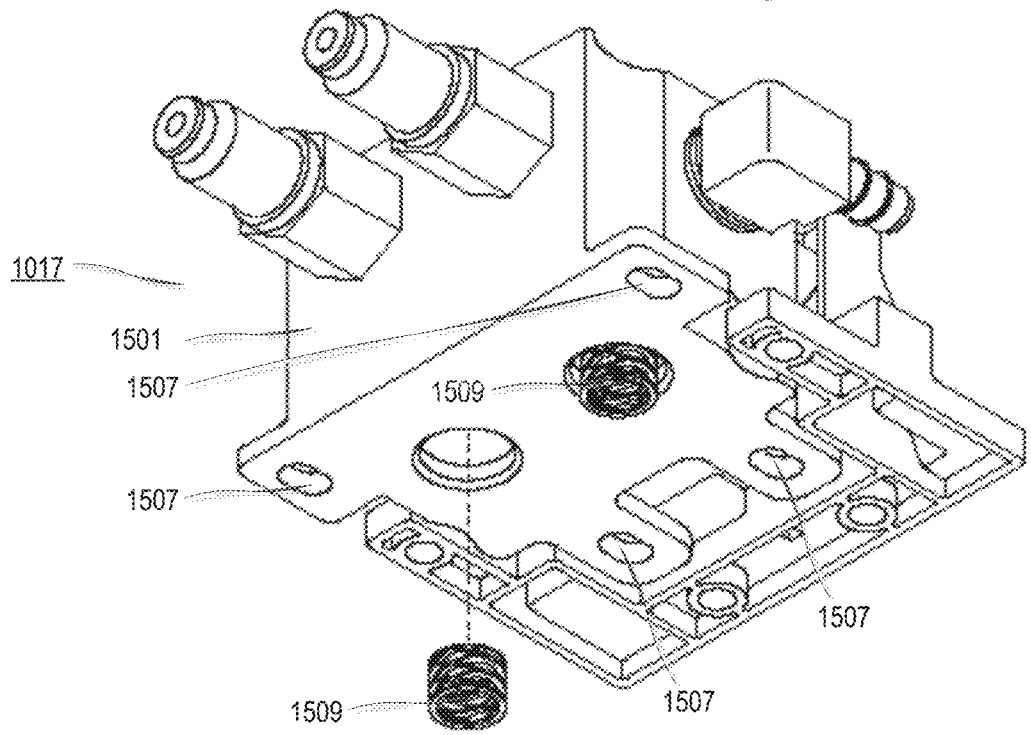
Figure 14C:
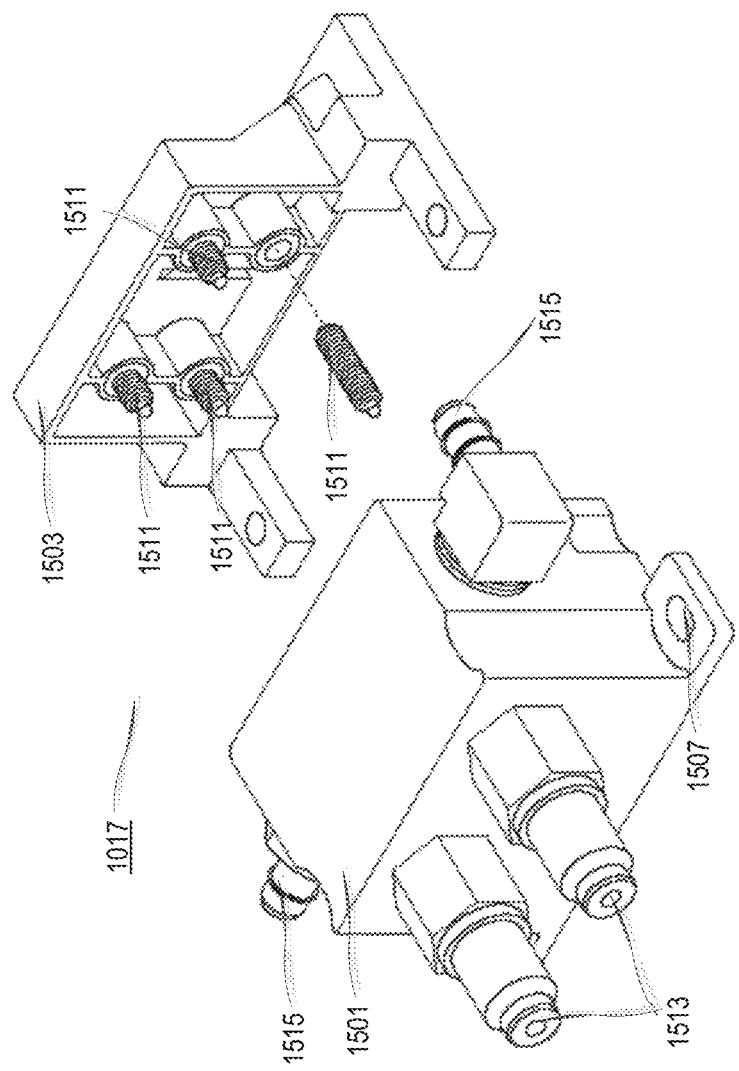

FIGS. 14A, 14B, and 14C are schematic views of a floating water block assembly 1017. As shown in FIG. 14A, the floating water block assembly 1017 may comprise a floating portion 1501 and a fixed portion 1503. The fixed portion 1503 or back stop may be fixedly attached to the PCB of the line-card 104. For example, screws, inserted through apertures 1505, may be utilized to securely fix the fixed portion 1503 of the floating water block assembly 1017 to the PCB. The floating portion 1501 may float on the PCB. In other words, screws may loosely fix the floating portion 1501 to the PCB, allowing the PCB to move up and down as the line-card 104 moves in a slot in sub-chassis. In such examples, the aperture 1507 may be longer and wider to allow for the floating portion 1501 to move back-and-forth and/or side-to-side.

As shown in FIG. 14B, the floating portion 1501 may include springs 1509 at the bottom surface. The springs 1509 (for example, wave disc springs) may allow for the floating portion 1501 to move in an up-and-down direction about the fasteners in aperture 1507. As shown in FIG. 14C, the fixed portion 1503 may include springs 1511 (for example, a ball plunger spring) that allow the floating portion 1501 to move back and forth about the fastener used for apertures 1507.

In another example, the floating portion 1501 may include two quick liquid disconnects 1513 and two hose barbs 1515. The liquid disconnects 1513 may connect to the switch sub-chassis liquid blindmate connectors. The hose barbs 1515 may connect to a flexible line or hose. The flexible line or hose may connect to various components on the PCB of the line-card, such as cold plates for the ASICs and/or other components. The flexibility of the flexible line may allow for movement of the floating portion 1501. Due to potential miss-alignments, the need arises for flexible liquid connections. Thus, the floating water block assembly 1017 described above allows for potential misalignments, via the flexible hose lines and the floating portion 1501 of the floating water block assembly 1017.

Figure 15:
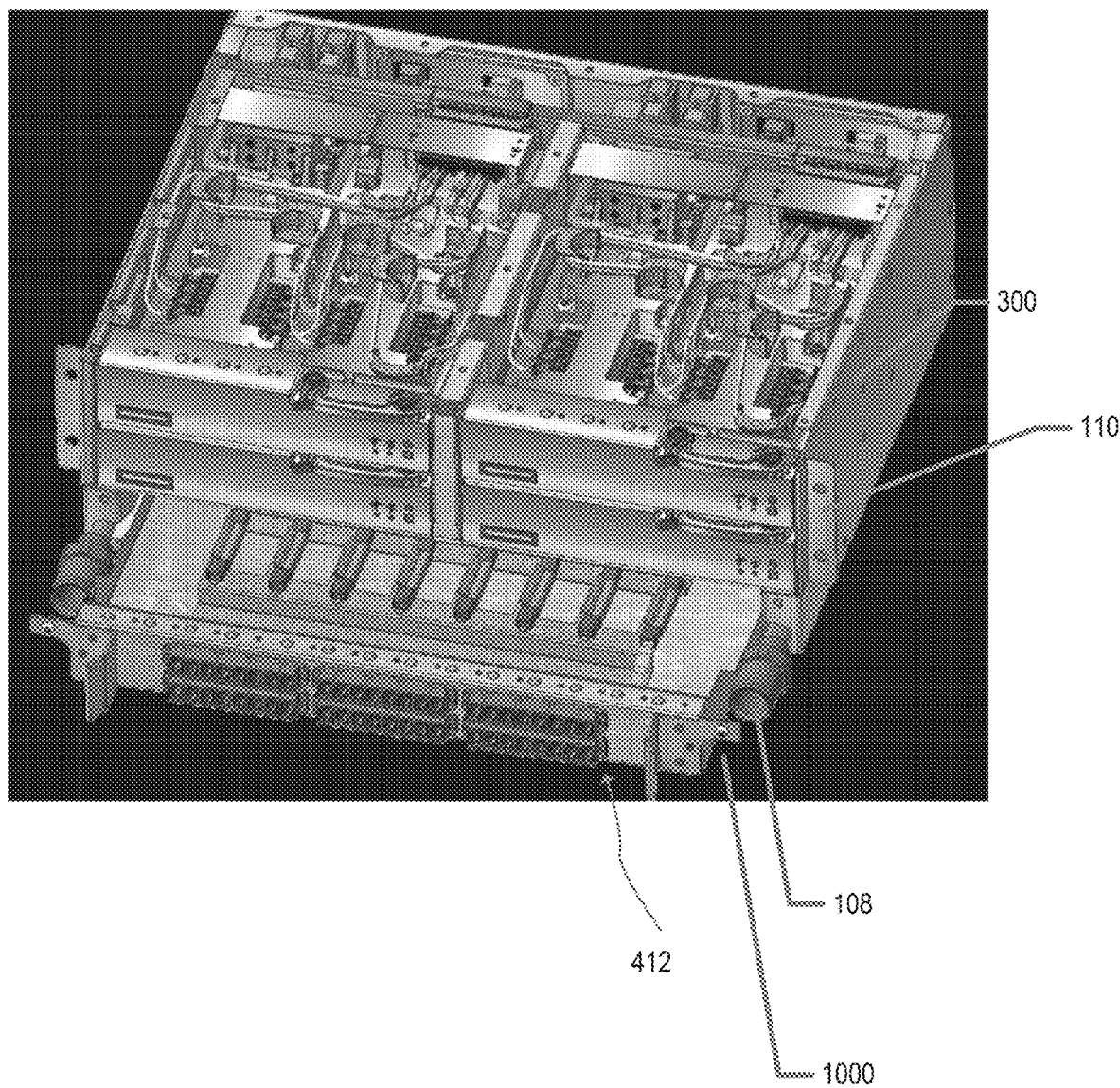
FIG. 15 is a schematic view of a switch sub-chassis, with a partially extended shuffle tray, according to an example.
Figure 16:
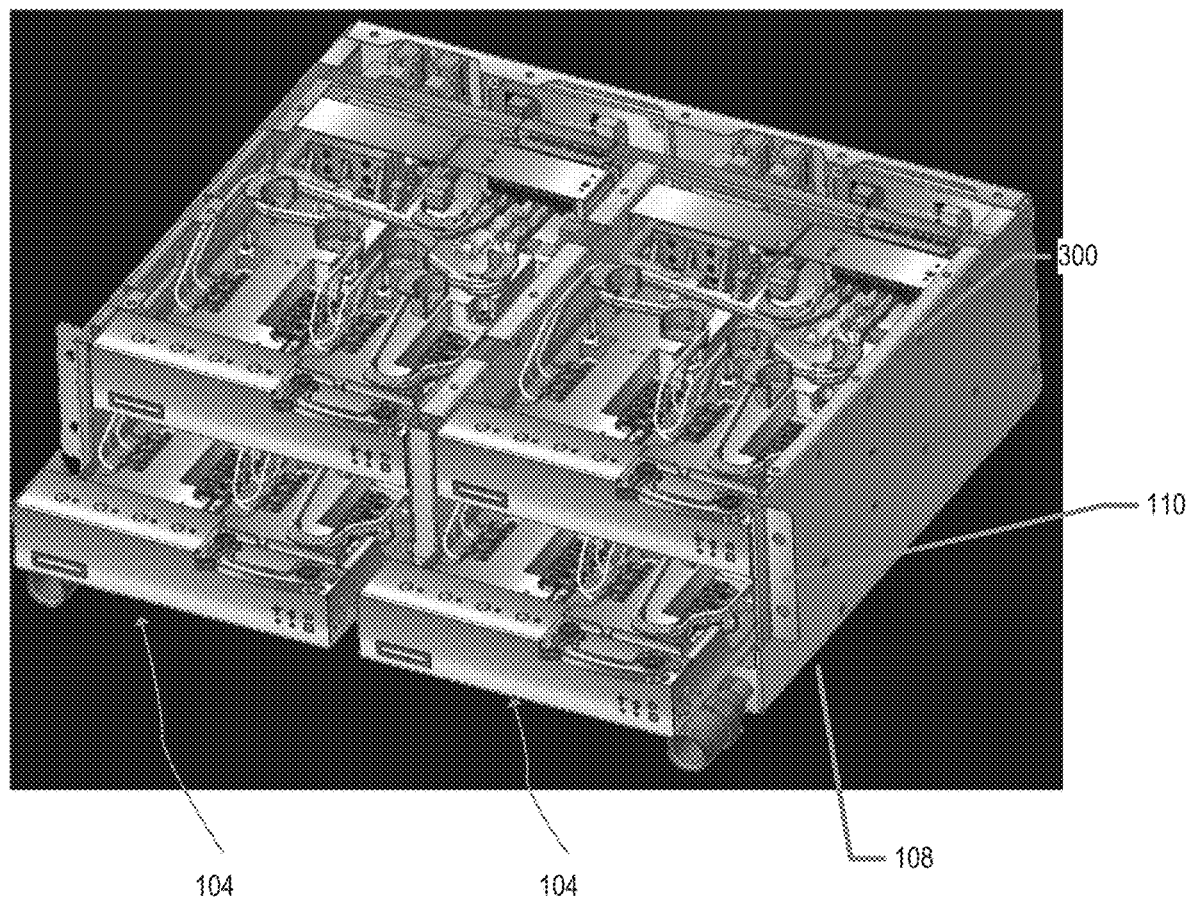
FIG. 16 is another schematic view of a switch sub-chassis, with partially extended line-cards, according to an example.

FIG. 15 is a schematic view of a switch sub-chassis, with a partially extended shuffle tray and FIG. 16 is another schematic view of a switch sub-chassis, with partially extended line-cards, according to an examples. FIGS. 15 and 16 respectively illustrate how a fiber shuffle tray 412 and/or line-cards 104 may be partially or fully removable from switch sub-chassis 102 without removal of the other. In another example, a cutout 1000 on the mounting feature for fiber shuffle tray 412 may accommodate a liquid port 108, is also shown.

Figure 17:
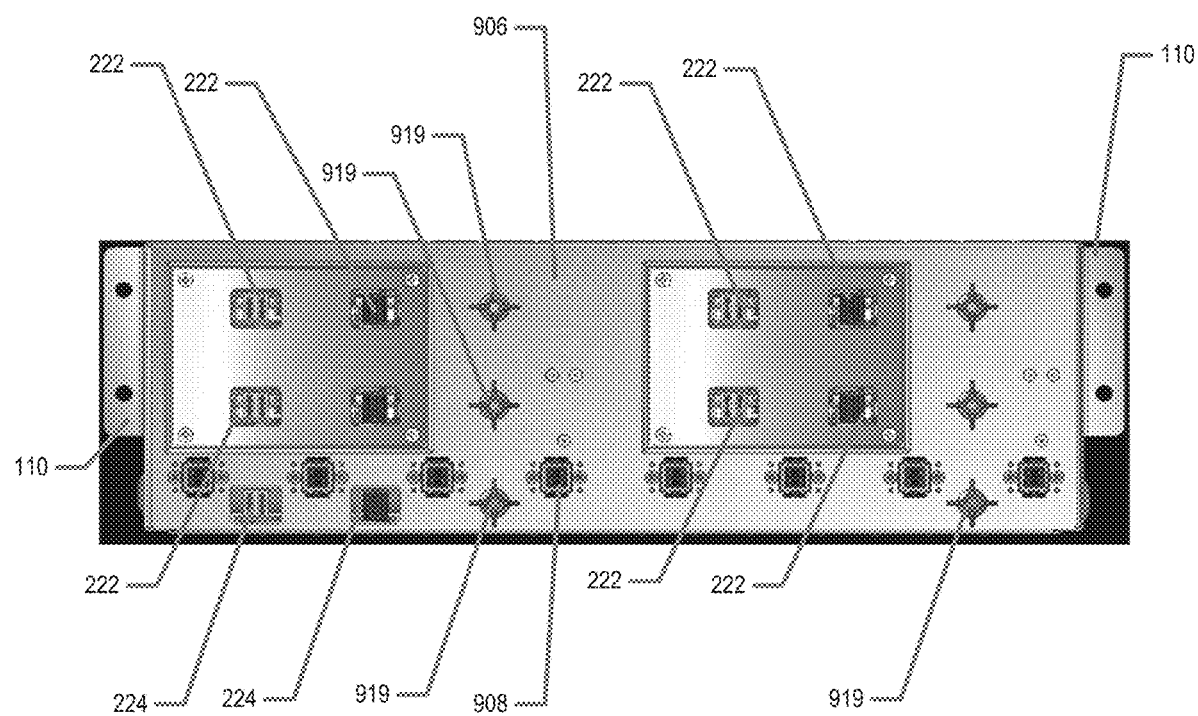
FIG. 17 is a schematic view of a front-end bulkhead of a switch sub-chassis, according to an example.

FIG. 17 is a schematic view of a front-end bulkhead of a switch sub-chassis 100, according to an example. In such examples, the front-end bulkhead 906 may include management connectors 224 and line-card electrical blindmate connectors 222 for the installed line-cards protruding though openings in front-end bulkhead 906. In further examples, the front-end bulkhead 906 may include Initial guidance features 919 (e.g., alignment holes with guide features as shown) and switch sub-chassis optical blindmate connectors 908.

Figure 18:
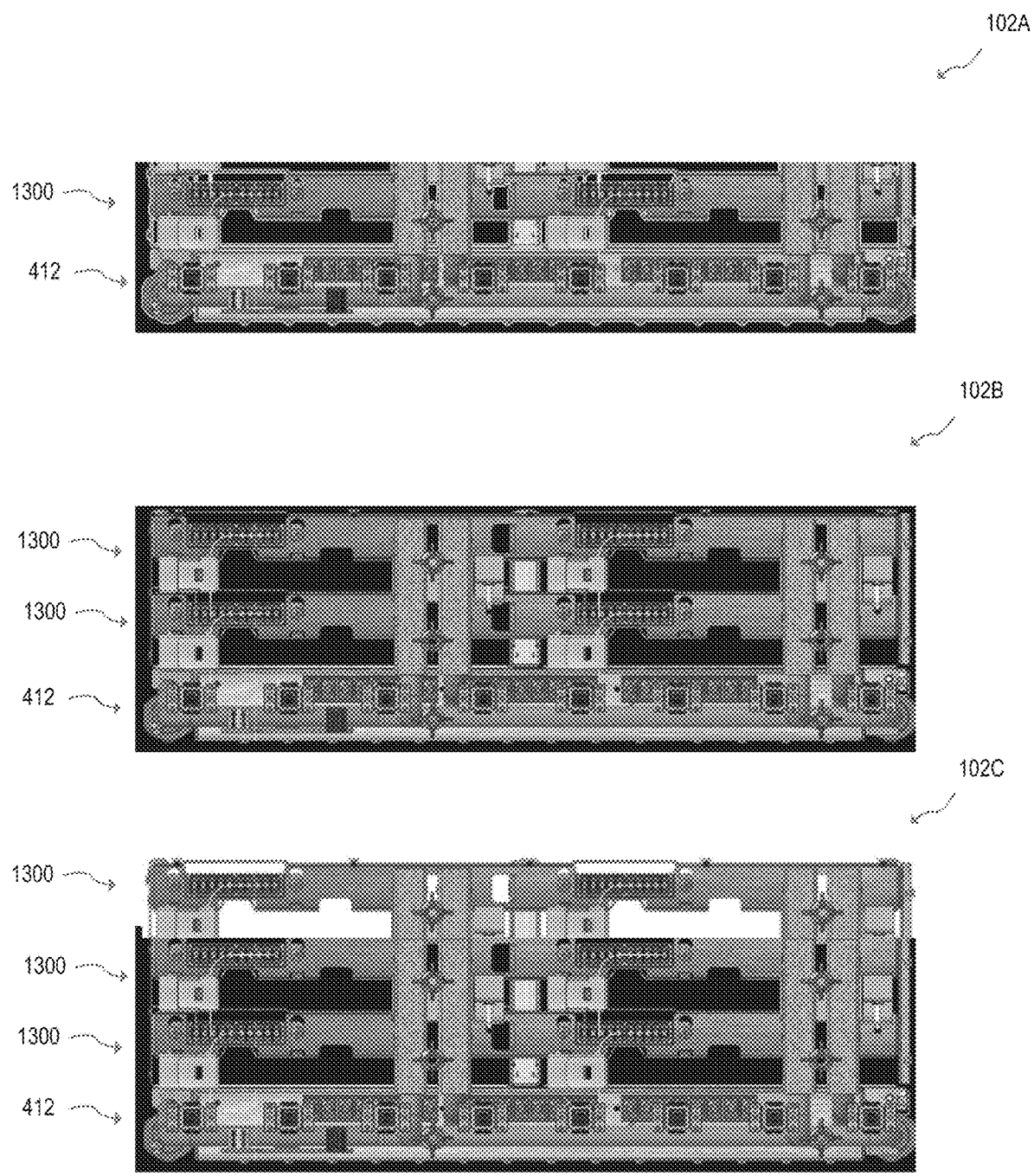
FIG. 18 is a schematic view of switch sub-chassis with various numbers of rows of line-card slot pairs, according to an example.

FIG. 18 is a schematic view of switch sub-chassis with various numbers of rows of line-card slot pairs, according to an example. In such examples, switch sub-chassis 102 may include two rows of two line-card slots for receiving four line-cards 104. However, it should be appreciated that these examples are illustrative and other arrangements are contemplated. For example, switch sub-chassis 102A may include a fiber shuffle tray 412 and one row 1300 of two side-by-side line-card slots (e.g., forming a line-card slot pair), a switch sub-chassis 102B may include a fiber shuffle tray 412 and two rows 1300 of side-by-side line-card slot pairs, and a switch sub-chassis 102C may include a fiber shuffle tray 412 and three rows 1300 of side-by-side line-card slot pairs. Accordingly, switch sub-chasses 102 may be scalable for various implementations in which the line-card cage assembly 902 may include one, two, three, four, or more than four vertically stacked rows 1300 of line-card slots 700 (e.g., in pairs in each row as shown).

In another example, a switch sub-chassis may be provided in which two, three, four, or more than four single line-card slots 700 are vertically stacked (e.g., in one-by-four configuration). In this type of vertically stacked arrangement, the faceplate connectors 106 may be disposed alongside the vertically stacked line-card slots (e.g., on a removable fiber shuffle tray that can be inserted into the base pan adjacent to the edges of one or more vertically stacked installed line-cards) or under the vertically stacked line cards (e.g., as in the two-by-two arrangement of FIG. 3). A one-by-four configuration may be more suitable for standard rack widths, whereas a two-by-two configuration such as that shown with switch sub-chassis 102B of FIG. 12 may take advantage of wider rack configurations and may provide easier to route liquid lines and drip pans in the sub-chassis.

Moreover, in the various examples described herein, line-cards 104 may be provided with optical connectors and liquid connectors that couple to corresponding switch sub-chassis connectors and with electrical connectors that couple a line-card printed circuit board to the enclosure midplane. In other examples, the printed circuit boards of the line-cards may mate directly with the enclosure midplane.

Figure 19:
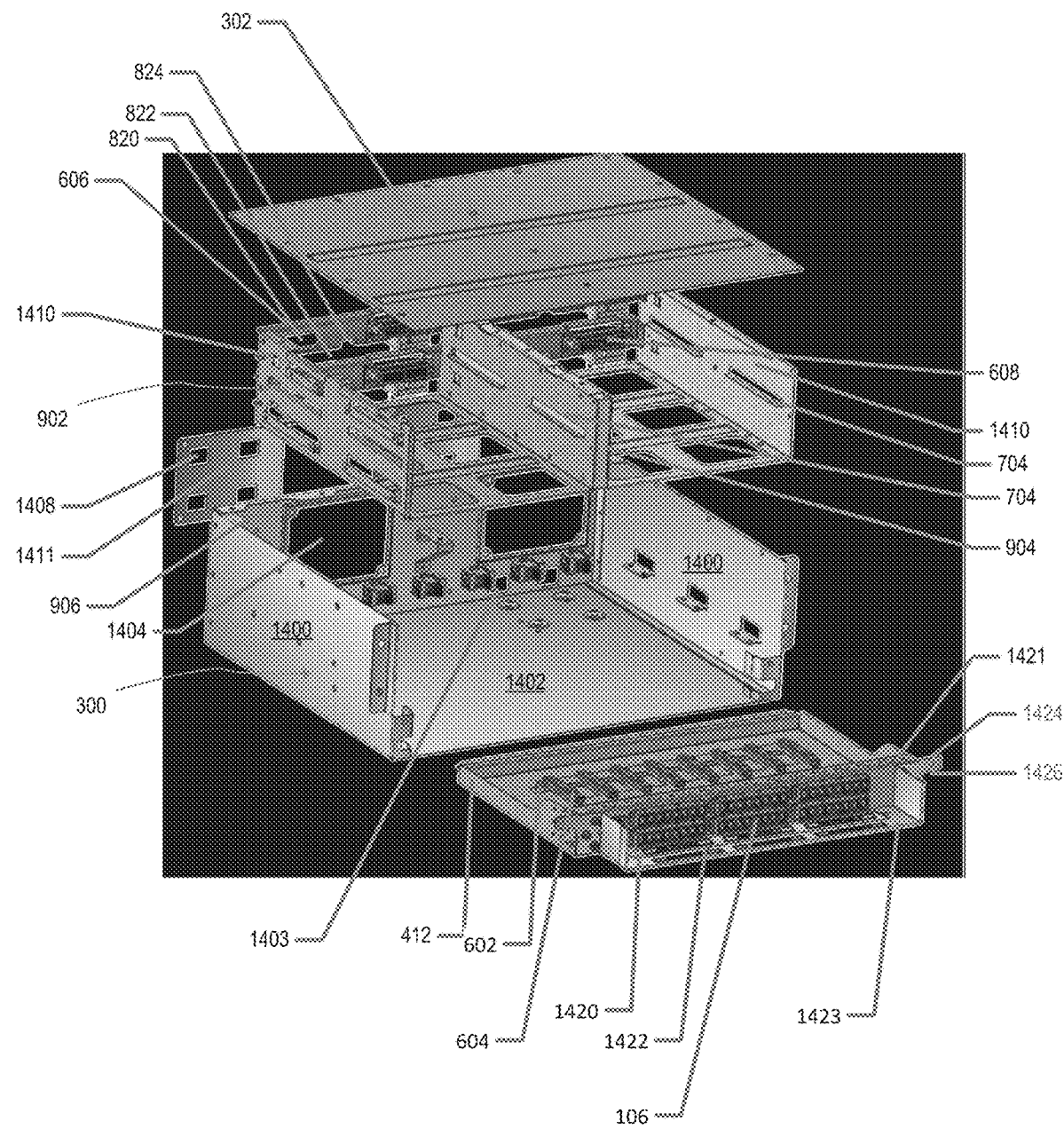
FIG. 19 is an exploded view of a switch sub-chassis, according to an example.

FIG. 19 is an exploded view of a switch sub-chassis 102, according to an example. Switch sub-chassis 102 may be implemented as a modularly blindmateable switch sub-chassis that includes base pan 300 having two sidewalls 1400 and a front-end bulkhead 906 extending between the two sidewalls. A line-card cage assembly 902 may be coupled to and extend between the two sidewalls 1400. A fence bracket 606 may be attached to the line-card cage assembly 902. One or more optical blindmate connectors 608 may be attached to the fence bracket 606 (e.g., one for each of several line-card slots having guide features 704). One or more holes 820 in the fence brackets 606 may be configured to allow pass-through of a line-card liquid blindmate connector 614. One or more notches 824 in the fence bracket may be configured to allow pass-under of a line-card electrical connector 222 for direct blindmate of the line-card electrical connector to an enclosure midplane 506.

In another example, a fiber shuffle tray 412 may include faceplate optical connectors 106 on a faceplate thereof. In an example, a liquid cooling system may include liquid ports on the rear-end bulkhead 1424 near the faceplate 1420. Faceplate 1420, which may be a part of the shuffle tray 412, may include ears 1425 for sub-chassis mechanical retention (e.g., using screws or other attachment members) to secure the faceplate 1420 on the rear-end bulkhead 1424. In another example, faceplate 1420 may include notches 1426 to clear the liquid ports 108 when the shuffle tray 412 is slid in the base pan 300, and retained on the rear-end bulkhead 1424. As described above in connection with a sub-chassis management board 624 can be provided in the base pan, may have a connector 224 configured to directly electrically blindmate to the enclosure midplane, and may have a management controller 626 configured to communicate with an enclosure manager.

In an example, when the line-card cage assembly 902 is installed in base pan 300, the line-card cage assembly may provide structural support for the base pan. When attached to base pan 300 and/or line-card cage assembly 902, sub-chassis lid 302 may enclose the line-card cage assembly 902 between sub-chassis lid 302 and a bottom surface 1402 of the base pan 300. In an example, a shuffle tray faceplate 1420 may attach to the fiber shuffle tray 412 at a rear-end opening of the base pan 300. The rear end opening is on the opposite side of the front-end openings 1404. The front-end bulkhead 906 may have openings 1404 where removable plates 1411 may be attached to. The openings 1408 of the removable plates 1411 may be for connectors 222 of line-cards 104 to go through. Front-end bulkhead 906 also includes openings 1403 for connectors 224 of switch sub-chassis 102 to go through. In such examples, the line-card cage assembly and the fiber shuffle tray may be arranged to be modularly installed within the base pan.

In FIG. 19, line-card cage assembly 902 may include two side-by-side line-card cages 1410 and multiple bridge brackets 904 between the two side-by-side line-card cages 1410. The multiple bridge brackets 904 and the fence bracket(s) 606 may attach the two side-by-side line-card 1410 cages together. As shown in FIG. 13, line-card guide features 704 may be arranged to align, during installation of a line-card into the line-card cage assembly 902, line-card optical blindmate connectors on the line-card with optical blindmate connectors 608 on the fence bracket 606, and align the line-card electrical connector with an enclosure midplane electrical blindmate connector for direct blindmate of the line-card electrical connector to the enclosure midplane.

As shown, fiber shuffle tray 412 may include a faceplate lip 1421 for the line-card cage assembly to rest on. The faceplate 1420 may be configured for attachment of various optical faceplate connectors 106. A faceplate shelf 1423 may be attached to the faceplate 1420 for cable management and that includes connector labels 1422.

Figure 20:
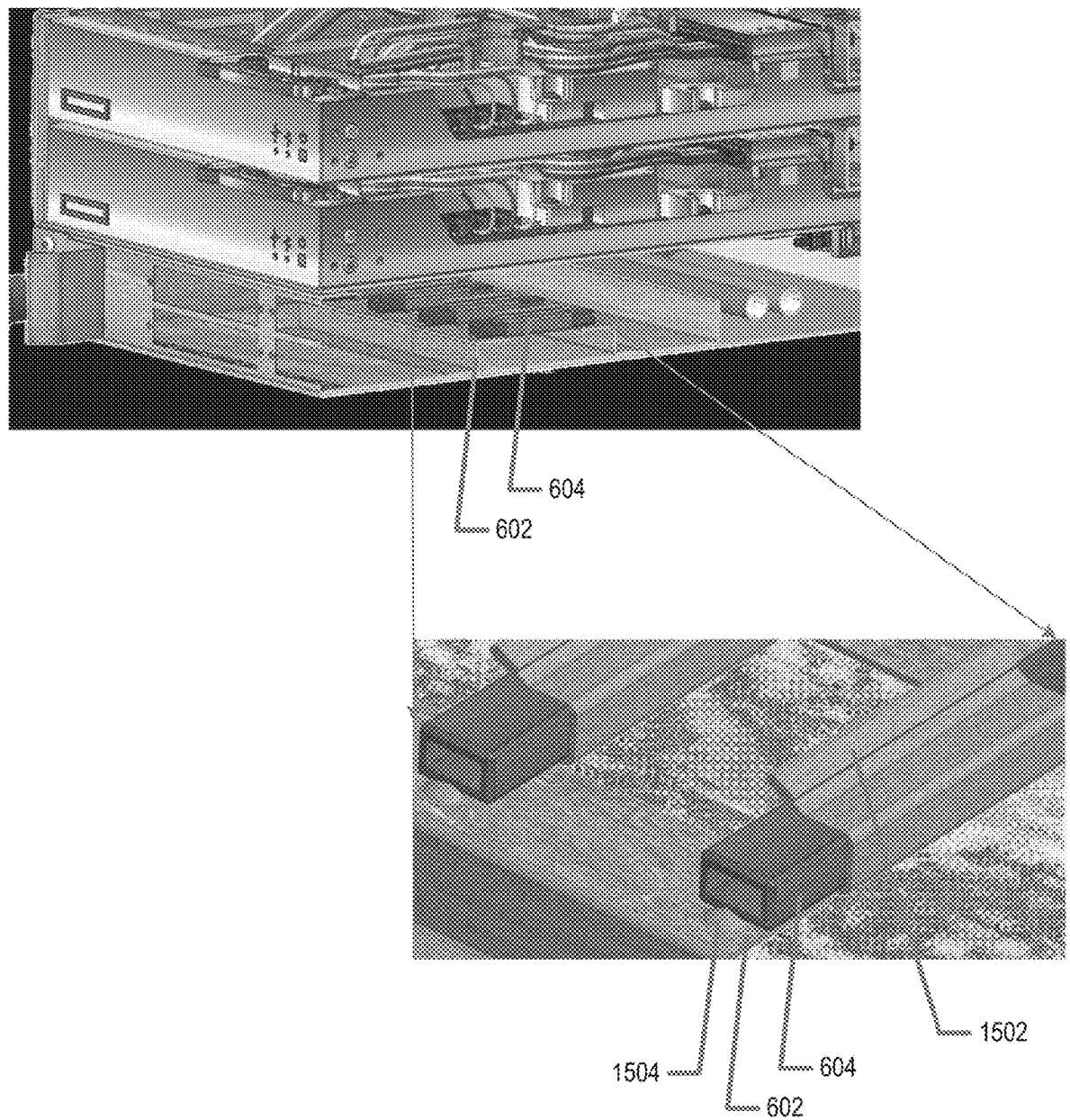
FIG. 20 is a perspective view of a portion of a switch sub-chassis, according to an example.

FIG. 20 is a perspective view of a portion of a switch sub-chassis 102, according to an example. In such examples, the switch sub-chassis 102 may include multiple fiber shuffle assemblies 604. Fibers off the fiber shuffle assemblies 604 are not shown. FIG. 19 also shows an enlarged view of fiber shuffle assemblies 604 and a portion of shuffle stand 602. Each shuffle assembly 604 may be configured to guide a plurality of fibers, such as fibers 600 (as shown in FIG. 6), among various connectors within switch sub-chassis 102 (e.g., among faceplate optical connectors 106 on the faceplate of fiber shuffle tray 412, optical blindmate connectors 908 on the front-end bulkhead 906, and optical blindmate connectors 608 attached to the fence bracket 606). In an example, shuffle stand 602 may include clamps 1502 where each shuffle assembly 604 may be secured by a clamp 1502 with a finger tab for easy installation, servicing, and/or upgrading of the shuffle assemblies. Shuffle stand 602 may also include additional securement features such as shuffle box stops 1504 to prevent the shuffle assemblies 604 from sliding on the stand in a direction parallel to the clamps 1502. Each shuffle assembly 604 may also be provided with an identifier (not shown) such as an electronic tag (e.g., a near-field communication (NFC) tag). Shuffle stand 602 may be provided with tag reader/writer coupling interface (e.g., antennae embedded in or attached to clamps 1502 or stops 1504) that are communicatively coupled to management controller 626 for monitoring and/or reporting of the contents and connection topology of switch 100. In this way, a fiber shuffle tray 412 having a plurality of fiber shuffle assemblies 604 that guide optical fibers 600 between various connectors of switch sub-chassis 102 can be provided in which each fiber shuffle assembly 604 includes a tag, and in which the sub-chassis management board 624 is coupled to a plurality of tag readers configured to detect installed fiber shuffle assemblies 604.

Figure 21:
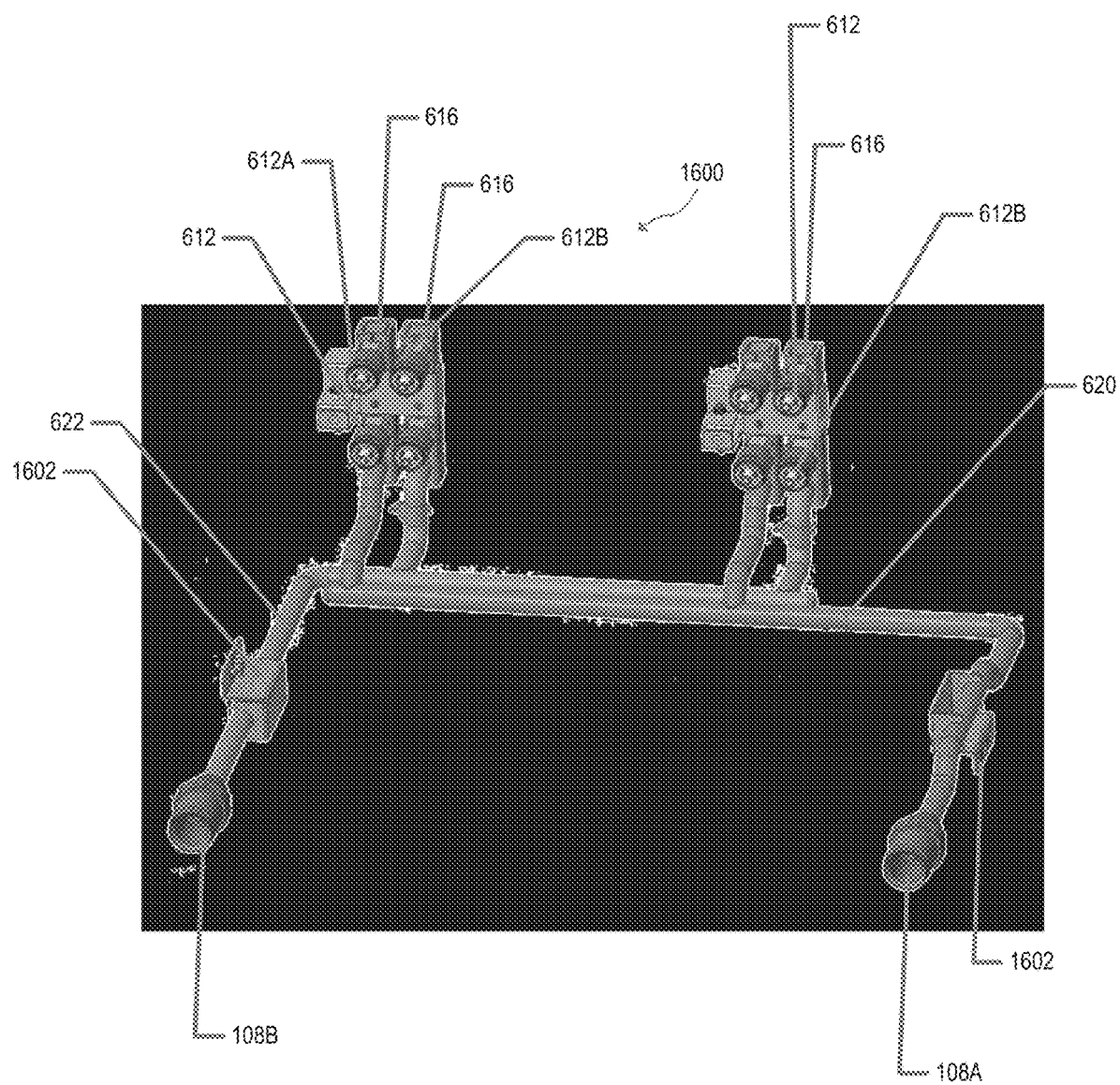
FIG. 21 is a perspective view of a liquid line assembly for a switch sub-chassis, according to an example.

FIG. 21 is a perspective view of a liquid line assembly 1600 for a switch sub-chassis 102, according to an example. In an example, the liquid line assembly 1600 may be modularly installed within the base pan 300 of switch sub-chassis 102. In an example, liquid line assembly 1600 may include a liquid supply line 620 and a liquid return line 622 each terminated, at an interior end, at a liquid manifold 616, including a separate supply manifold and separate return manifold, and, at an exterior end, with a detachable leak-proof liquid coupler (e.g., a quick disconnect) 108 for liquid interface to rack liquid lines 408 of a server rack 402. In another example, liquid couplers 108 may include a supply line liquid coupler 108A and a return line liquid coupler 108B. In a further example, the liquid manifold 616 at the interior end of the liquid supply line 620 and the liquid manifold 616 at the interior end of the liquid return line 622 may each include a detachable leak-proof liquid coupler (e.g., a quick disconnect) 612 configured for liquid blindmate to multiple, vertically stacked line-cards 104. In another example, the liquid couplers 612 may include supply line liquid couplers 612A and return line liquid couplers 612B. Side attachment members 1602 may be provided to attach portions of the liquid supply line 620 and the liquid return line to the side walls 1400 of base pan 300. Similarly, front attachment members 1603 may be provided to attach other portions of the liquid manifolds 616 on the front-end bulkhead 906 of base pan 300.

Figure 22:
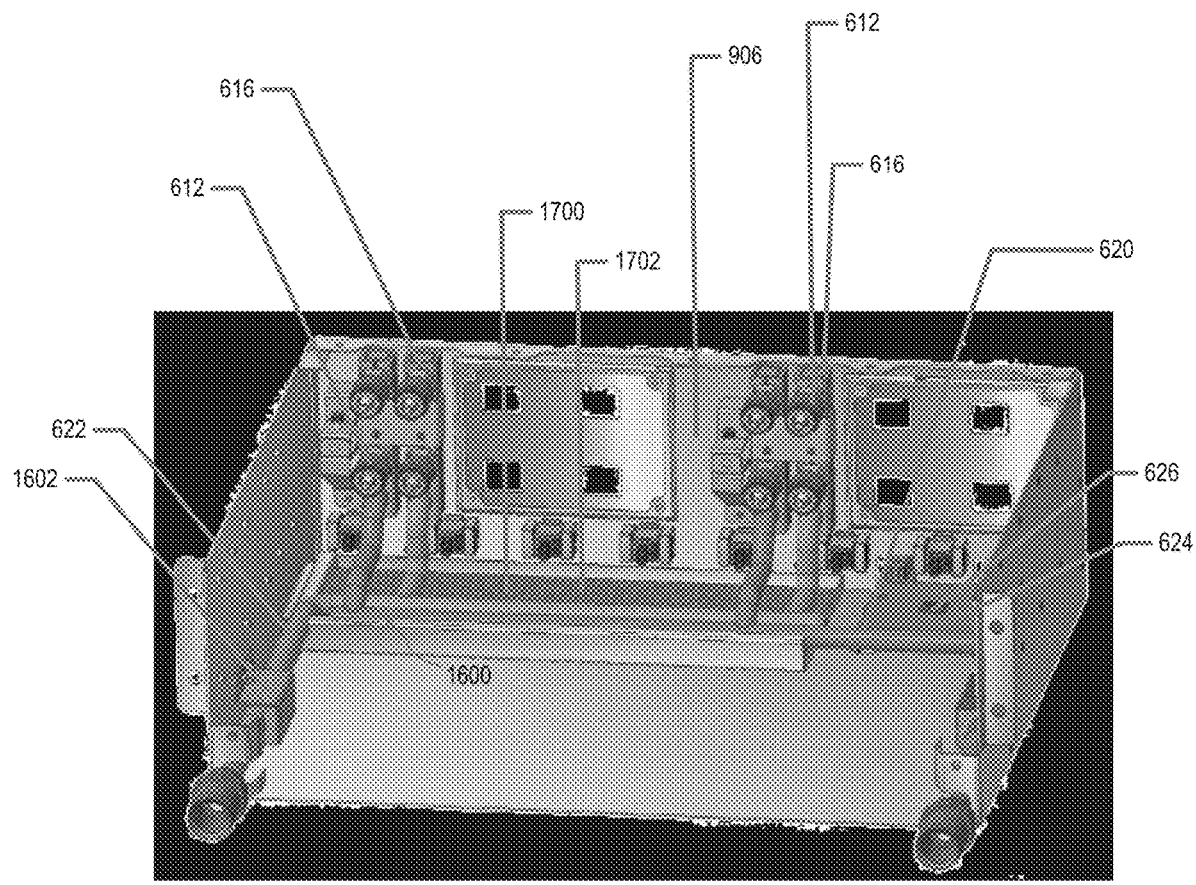
FIG. 22 is a perspective view of the liquid line assembly modularly installed in a base pan, according to an example.

FIG. 22 is a perspective view of the liquid line assembly 1600 modularly installed in a base pan, according to an example. In an example, the liquid line assembly 1600 may modularly install in base pan 300 using side attachment members 1602. In another example, the liquid manifolds 616 of liquid line assembly 1600 may be modularly attached to the front-end bulkhead 906 of base pan 300 by means of front attachment members 1603. In another example, a drip pan 1700 may be disposed in the base pan 300 and extend under the liquid manifolds 616. A liquid sensor 1702, such as a sensor rope, may be provided in drip pan 1700 and communicatively coupled to sub-chassis management board 624 and management controller 626.

Figure 23:
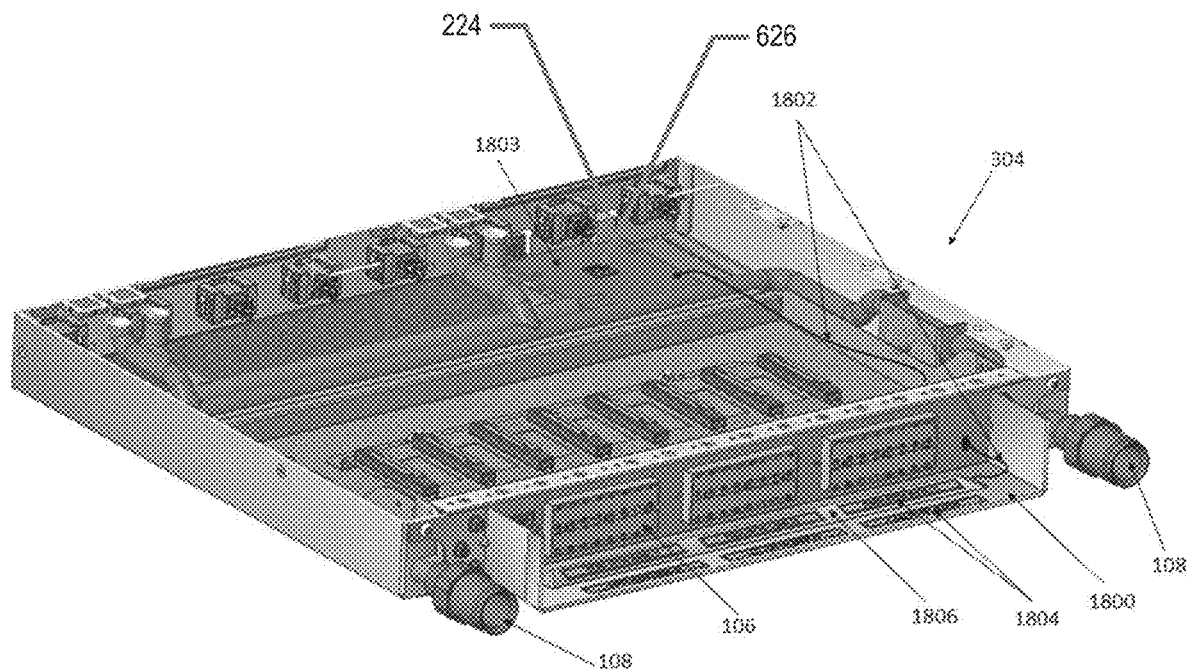
FIG. 23 is a schematic view of a fiber shuffle tray, according to an example.

FIG. 23 is a schematic view of a fiber shuffle tray, according to an example. In an example, faceplate shelf 1800 for fiber shuffle tray 412 may be provided with connectors 106 and labels 1804 that are backlit by an embedded illuminator 1806 (e.g., a light pipe that opto-mechanically couples to a light source such as a light-emitting diode) that is controlled by management controller 626 via indicator wires 1802 that extend between management board 624 (e.g., having a top surface 1803) and the illuminator 1806.

According to some aspects of the present disclosure, a modularly blindmateable switch sub-chassis is provided that includes a base pan having two sidewalls and a front-end bulkhead extending between the two sidewalls, a line-card cage assembly coupled to and extending between the two sidewalls, a fence bracket attached to the line-card cage assembly, at least one optical blindmate connector attached to the fence bracket, at least one hole in the fence bracket configured to allow pass-through of a line-card liquid blindmate connector, at least one notch in the fence bracket configured to allow pass-under of a line-card electrical connector for direct blindmate of the line-card electrical connector to an enclosure midplane, a fiber shuffle tray having a plurality of faceplate optical connectors on a faceplate, a liquid cooling system including liquid ports at a rear-end bulkhead near the faceplate, and a sub-chassis management board having a connector configured to directly electrically blindmate to the enclosure midplane and having a management controller configured to communicate with an enclosure manager.

According to other aspects of the present disclosure, a modularly blindmateable switch sub-chassis is provided that includes a base pan, a line-card cage assembly having a plurality of line-card slots for serviceably receiving a plurality of line-cards, a fence bracket attached to the line-card cage assembly, and a liquid line assembly modularly installed within the base pan, the liquid line assembly having a liquid supply line and a liquid return line each terminated, at an interior end, at a liquid manifold that is modularly attached to a front-end bulkhead of the base pan and, at an exterior end, with a detachable leak-proof liquid coupler for liquid interface to rack liquid lines of a server rack. The liquid manifold at the interior end of the liquid supply line and the liquid manifold at the interior end of the liquid return line each include a detachable leak-proof liquid coupler configured for liquid blindmate to one of the plurality of line-cards.

According to other aspects of the present disclosure, a modularly blindmateable switch sub-chassis is provided that includes a sub-chassis management board having a management board connector for direct blindmate to a midplane of an enclosure, a fiber shuffle tray having a plurality of faceplate optical connectors on a faceplate, a plurality of line-card slots each including optical blindmate connectors and liquid blindmate connectors for a line-card, liquid ports near the faceplate fluidly coupled to the liquid blindmate connectors for the line-cards, and a plurality of fibers coupled between the faceplate optical connectors and the optical blindmate connectors for each of the plurality of line-card slots.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be examples. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A line-card comprising:
    an optical blindmate connector to connect to the midplane of the switch sub-chassis; and
    a printed circuit board (PCB) including:
        an application specific integrated circuit (ASIC), wherein the ASIC includes a cold-plate connected to flexible liquid lines and wherein the flexible liquid lines connect to a water block assembly, the water block assembly including a liquid blindmate connector; and
        an electrical blindmate connector to connect to a midplane of a switch sub-chassis.

2. The line-card of claim 1, wherein the liquid blindmate connectors connect to a liquid manifold within the sub-chassis and provides liquid for cooling to the cold-plate.

3. The line-card of claim 1, wherein the ASIC is a switch ASIC with optical engines.

4. The line-card of claim 3, wherein fiber cables connect the switch ASIC to the optical blindmate connector and spools are mounted in various position on the within the line-card.

5. The line-card of claim 1, wherein the line-card includes a faceplate with a handle latch.

6. The line-card of claim 5, wherein the faceplate includes status indicators, a removal request button, and a power switch.

7. The line-card of claim 6, wherein the faceplate includes an alphanumeric display to indicate an ASIC number and to indicate errors.

8. A line-card comprising:
    a rear end including a faceplate;
    a middle portion including a PCB, wherein the PCB includes a switch ASIC with high density optical engines, wherein the switch ASIC each include a cold-plate;
    two sides including guide features to allow insertion into a switch sub-chassis; and
    a front end including:
        an optical blindmate connector to connect the two switch ASICs, via fiber cables, to a midplane of the switch sub-chassis;
        an electrical blindmate connector to connect the two switch ASICs to the midplane of the switch sub-chassis to provide power and management signals; and
        a liquid blindmate connector to connect the cold-plates, via flexible liquid hoses, to a liquid manifold of the switch sub-chassis.

9. The line-card of claim 8, wherein the PCB includes bolster plates located underneath and opposite the switch ASIC.

10. The line-card of claims wherein the line-card includes a second switch ASIC and wherein the two switch ASICs are stagger mounted to the PCB with a half chip ferrule pitch to allow for fiber cable clearance.

11. The line-card of claim 8, wherein the cold-plates include modularly installable spools strategically placed by extra fiber cable lengths.

12. The line-card of claim 11, wherein the spools have a diameter larger than the minimum bend radii of the fiber cable.

13. The line-card of claim 8, the faceplate includes a handle latch to latch to the switch sub-chassis when the line-card is fully inserted into the switch sub-chassis.

14. The line-card of claim 8, wherein the line-card includes a water block assembly, to connect to the liquid blindmate connector, including:
    quick disconnects for supply and return liquid blindmates; and
    hose barbs to accept flexible water hoses.

15. The line-card of claim 14, wherein the water block assembly includes a fixed portion and a floating portion.

16. The line-card of claim 15, wherein the fixed portion is a backstop with ball spring plungers and the fixed portion is fixedly attached to the PCB and wherein the floating portion is loosely connected to the PCB and moves in a back and forth direction against the backstop, via the ball spring plungers, and an up and down direction and side to side direction, via the connection to the PCB.

\* \* \* \* \*